US012739235B2

(12) United States Patent
Little et al.

(10) Patent No.: US 12,739,235 B2
(45) Date of Patent: Sep. 15, 2026

(54) METHODS, APPARATUSES, AND COMPUTER PROGRAMS FOR PROVIDING ACCESS TO A SUBSET OF A RESOURCE MANAGED BY AN ENTITY OF A MOBILE COMMUNICATION NETWORK

(71) Applicant: Nokia Technologies Oy, Espoo (FI)

(72) Inventors: Jonathan Little, Bristol (GB); Ioannis Mouroulis, Athens (GR); Jani Petteri Ekman, Espoo (FI); Ulrich Wiehe, Munich (DE); Alexander Milinski, Munich (DE); Apostolos Papageorgiou, Massy (FR); Pallab Gupta, Bangalore (IN); Laurent Thiebaut, Massy (FR)

(73) Assignee: Nokia Technologies Oy, Espoo (FI)

( * ) Notice: Subject to any disclaimer, the term of this patent is extended or adjusted under 35 U.S.C. 154(b) by 111 days.

(21) Appl. No.: 18/521,059

(22) Filed: Nov. 28, 2023

(65) Prior Publication Data

US 2024/0179140 A1 May 30, 2024

(30) Foreign Application Priority Data

Nov. 28, 2022 (GB) ..................................... 2217774

(51) Int. Cl.
*H04L 9/40* (2022.01)

(52) U.S. Cl.
CPC ................................ *H04L 63/0807* (2013.01)

(58) Field of Classification Search
CPC .................................................. H04L 63/0807
See application file for complete search history.

(56) References Cited

U.S. PATENT DOCUMENTS

2012/0117626 A1* 5/2012 Yates .................... H04L 63/101 726/4
2014/0201816 A1* 7/2014 Brannon ............... H04L 63/102 726/4

(Continued)

FOREIGN PATENT DOCUMENTS

EP 2847699 A1 3/2015
WO 00/10066 A2 2/2000
WO 2013169820 A1 11/2013

OTHER PUBLICATIONS

"3rd Generation Partnership Project; Technical Specification Group Core Network and Terminals; 5G System; Network Function Repository Services; Stage 3 (Release 17)", 3GPP TS 29.510, V17.6.0, Jun. 2022, pp. 1-306.

(Continued)

*Primary Examiner* — Yonas A Bayou
(74) *Attorney, Agent, or Firm* — Nokia Technologies Oy

(57) ABSTRACT

There are provided measures for (enabling/realizing) network operability on a resource instance level in (a core network of) a mobile/wireless communication system. Such measures may exemplarily comprise that an initiator entity sends a service request for a service operation on a specific resource managed by a responder entity of the network, said service request comprising at least one resource filter specifying a set of resource instances of the specific resource that the service operation is to be performed on, and receives a service response to the service request from the responder entity, said service response comprising a result of performing the service operation on the set of resource instances specified by the at least one resource filter.

36 Claims, 18 Drawing Sheets

(56) References Cited

U.S. PATENT DOCUMENTS

| | | | | |
|---|---|---|---|---|
| 2016/0094560 | A1* | 3/2016 | Stuntebeck | H04L 63/08 726/1 |
| 2017/0126692 | A1* | 5/2017 | Stuntebeck | H04L 67/303 |
| 2018/0197122 | A1* | 7/2018 | de Kadt | H04L 63/10 |
| 2018/0352002 | A1* | 12/2018 | Ramachandran | H04L 63/061 |
| 2019/0108256 | A1* | 4/2019 | Estes | G06F 16/283 |
| 2021/0058446 | A1* | 2/2021 | Qiu | G06F 16/9538 |
| 2021/0288802 | A1* | 9/2021 | Muhanna | H04W 12/122 |
| 2022/0222593 | A1* | 7/2022 | de Kadt | G06Q 10/06 |
| 2022/0294775 | A1* | 9/2022 | Singh | H04L 63/0815 |
| 2022/0295282 | A1* | 9/2022 | Rajput | H04W 8/18 |
| 2024/0107299 | A1* | 3/2024 | Wang | H04W 12/043 |

OTHER PUBLICATIONS

"3rd Generation Partnership Project; Technical Specification Group Core Network and Terminals; 5G System; Technical Realization of Service Based Architecture; Stage 3 (Release 17)", 3GPP TS 29.500, V17.7.0, Jun. 2022, pp. 1-127.

"3rd Generation Partnership Project; Technical Specification Group Services and System Aspects; Security architecture and procedures for 5G system (Release 17)", 3GPP TS 33.501, V17.6.0, Jun. 2022, pp. 1-292.

"3rd Generation Partnership Project; Technical Specification Group Core Network and Terminals; 5G System; Unified Data Management Services; Stage 3 (Release 17)", 3GPP TS 29.503, V17.7.0, Jun. 2022, pp. 1-514.

"3rd Generation Partnership Project; Technical Specification Group Core Network and Terminals; 5G System; Unified Data Repository Services; Stage 3 (Release 17)", 3GPP TS 29.504, V17.7.0, Jun. 2022, pp. 1-55.

"3rd Generation Partnership Project; Technical Specification Group Core Network and Terminals; 5G System; Usage of the Unified Data Repository services for Subscription Data; Stage 3 (Release 17)", 3GPP TS 29.505, V17.7.0, Jun. 2022, pp. 1-283.

"3rd Generation Partnership Project; Technical Specification Group Core Network and Terminals; 5G System; Usage of the Unified Data Repository service for Policy Data, Application Data and Structured Data for Exposure; Stage 3 (Release 17)", 3GPP TS 29.519, V17.8.0, Sep. 2022, pp. 1-224.

"3rd Generation Partnership Project; Technical Specification Group Core Network and Terminals; 5G System; Unstructured Data Storage Services Stage 3; (Release 17)", 3GPP TS 29.598, V17.6.0, Jun. 2022, pp. 1-121.

Combined Search and Examination Report received for corresponding United Kingdom Patent Application No. 2217774.5, dated May 26, 2023, 9 pages.

* cited by examiner

METHODS, APPARATUSES, AND COMPUTER PROGRAMS FOR PROVIDING ACCESS TO A SUBSET OF A RESOURCE MANAGED BY AN ENTITY OF A MOBILE COMMUNICATION NETWORK

CROSS REFERENCE TO RELATED APPLICATIONS

This application claims the benefit of priority of United Kingdom Patent Application No. 2217774.5 filed Nov. 28, 2022, which is hereby incorporated by reference as if reproduced in its entirety.

TECHNICAL FIELD

Some example embodiments of the present disclosure relate to mobile communication networks. More specifically, the example embodiments of present disclosure relate to methods, apparatuses (i.e., devices, entities, and/or elements) and computer programs for providing access to a subset of a resource managed by an entity of (a core network of) a mobile communication network.

BACKGROUND

A mobile communication network may include a mobile communication system conforming to 3GPP specifications for 5G or NR, generally referred to as a 5G system (5GS). A 5GS may comprise one or more access networks (e.g., 5G_access networks) and a core network (e.g., a 5GC). A 5GC may have a service-based architecture (SBA) as described in the 3GPP standard for 5G or NR. The service-based architecture (SBA) of the 5GC specifies a set of network functions (NFs) and a common bus that connects the NFs. Each NF of the 5GC registers the services it offers with a network function repository function (NRF) of the 5GC. The NRF is a database used by NFs of the 5GC to discover the services offered by other NFs. A NF of the 5GC that offers a service is generally referred to as a NF service producer ("producer") and a NF that consumes a service offered by another NF is generally referred to as a NF service consumer ("consumer"). The SBA also defines, for various services offered by producers, a service-based interface (SBI) between the consumer and the producer, over which communication relating to service operations are carried, either directly or via one or more intermediate NFs and/or service communication proxies (SCP).

Accordingly, a consumer can request, initiate or cause a service operation on a resource managed by a producer. A consumer can also access a service offered by a producer, where the service provides access to resources managed by the producer (i.e., the service makes the resources managed by the producer accessible to consumers). A consumer may or may not require authorization to access such a service or to request, initiate, or cause a service operation on a resource managed by the producer that is accessible via such a service.

As an example, a UDM of a 5GC may be a consumer and a UDR of the 5GC may be a producer. The UDM may access a service of the UDR that provides access to resource stored in and managed by the UDR. In the UDR, several different resources may be stored therein and managed by the UDR. The UDR may offer a service that makes the resources managed by the UDR accessible to the UDM, and a SBI between the UDM and the UDR may specify the resources that may be accessed and the service operations that may be performed on the resources.

Further, to access a service offered by a producer, or resources that are accessible via the service, consumers may be required to be authorized, either by obtaining an authorization token from a repository, such as the NRF of a 5GC, or by a policy configured at the UDR which specifies that consumers are authorized. The repository or the local policy may include a mapping between the resource that may be accessed and the consumer attempting to access the resource. An authorization token may allow a consumer to access a service offered by a producer, may allow a consumer to access a resource that is accessible via the service offered by the producer, or may allow the consumer to request, initiate or cause a service operation on a resource that is accessible via the service.

However, in a 5GC, a repository, such as the NRF, is only capable of providing authorization (i.e., an authorization token) to consumers that allows consumers to access to an entire resource that is accessible via a service offered by a producer, i.e., all instances of a resource, and the consumer can then request, initiate or cause a service operation on the entire resource, i.e., all instances of the resource.

SUMMARY

According to an example embodiment, there is provided a method of (or, stated in other words, operable or for use in/by) an initiator entity of a network, the method comprising: sending a service request for a service operation on a specific resource managed by a responder entity of the network, said service request comprising at least one resource filter specifying a set of resource instances of the specific resource that the service operation is to be performed on, and receiving a service response to the service request from the responder entity, said service response comprising a result of performing the service operation on the set of resource instances specified by the at least one resource filter.

According to an example embodiment, there is provided an apparatus of (or, stated in other words, operable or for use in/by) an initiator entity of a network, the apparatus comprising: means for sending a service request for a service operation on a specific resource managed by a responder entity of the network, said service request comprising at least one resource filter specifying a set of resource instances of the specific resource that the service operation is to be performed on, and means for receiving a service response to the service request from the responder entity, said service response comprising a result of performing the service operation on the set of resource instances specified by the at least one resource filter.

According to an example embodiment, there is provided an apparatus of (or, stated in other words, operable or for use in/by) an initiator entity of a network, the apparatus comprising at least one processor, and at least one memory storing instructions that, when executed by the at least one processor, cause the apparatus at least to perform: sending a service request for a service operation on a specific resource managed by a responder entity of the network, said service request comprising at least one resource filter specifying a set of resource instances of the specific resource that the service operation is to be performed on, and receiving a service response to the service request from the responder entity, said service response comprising a result of performing the service operation on the set of resource instances specified by the at least one resource filter.

According to an example embodiment, there is provided an apparatus of (or, stated in other words, operable or for use in/by) an initiator entity of a network, the apparatus comprising: circuitry configured to send a service request for a service operation on a specific resource managed by a responder entity of the network, said service request comprising at least one resource filter specifying a set of resource instances of the specific resource that the service operation is to be performed on, and circuitry configured to receive a service response to the service request from the responder entity, said service response comprising a result of performing the service operation on the set of resource instances specified by the at least one resource filter.

According to various developments/modifications, any one of the aforementioned method-related and/or apparatus-related example embodiments may include one or more of the following features:

- the service operation comprises a resource operation for causing filtering and/or selection of the set of resource instances specified by the at least one resource filter at the responder entity,
- the resource operation comprises any one of a search operation for causing search of the set of resource instances specified by the at least one resource filter at the responder entity, a read operation for causing reading of the set of resource instances specified by the at least one resource filter at the responder entity, a delete operation for causing deletion of the set of resource instances specified by the at least one resource filter at the responder entity, a modify/update operation for causing modification or update of the set of resource instances specified by the at least one resource filter at the responder entity, or a create operation for causing creation of the set of resource instances specified by the at least one resource filter at the responder entity,
- the method, functionality, operability or configuration comprises or enables: sending an authorization request for authorization for the initiator entity to request a service operation on the specific resource to a repository entity of the network, and/or receiving an authorization response to the authorization request for authorization for the initiator entity to request a service operation on the specific resource from the repository entity,
- the authorization request comprises at least one resource filter specifying resource instances of the specific resource that authorization is requested for, and/or the authorization request comprises identification information of the initiator entity, and/or the authorization response comprises an authorization token for the initiator entity, comprising at least one resource filter specifying resource instances of the specific resource that authorization is granted for, said authorization token designating authorization of the initiator entity to request a service operation on the resource instances specified by the at least one resource filter in the authorization token,
- the resource instances specified by the at least one resource filter in the authorization token correspond to or encompass the set of resource instances specified by the at least one resource filter in the service request,
- the service request comprises the authorization token, and/or the authorization request and/or the at least one resource filter in the authorization request is issued in or by a token request or discovery header,
- the at least one resource filter is based on and/or comprises content of resource instances of the set of resource instances and/or content of a resource identifier referring to resource instances of the set of resource instances,
- the content defines at least one of a group, a range or a pattern of the set of resource instances,
- the content of the resource identifier is based on or comprises a universal resource identifier variable, comprising a path and/or query parameter of a universal resource identifier of the specified resource,
- the content of resource instances is based on or comprises at least one attribute within the specified resource,
- the at least one resource filter is based on and/or comprises metadata associated with resource instances of the set of resource instances,
- the metadata defines a property of the resource instances of the set of resource instances, and/or the metadata is based on or comprises an identifier of an owner or tenant of the resource instances of the set of resource instances,
- the service request for the service operation comprises an indication indicating that provision of complete or partial metadata associated with the resource instances of the set of resource instances is requested, and/or the service response to the service request comprises the requested complete or partial metadata associated with the resource instances of the set of resource instances,
- the at least one resource filter comprises or is constituted by a plurality of resource filters each specifying resource instances of the specific resource, and/or the plurality of resource filters in combination specify the set of resource instances of the specific resource that the service operation is to be performed on,
- the initiator entity is or comprises a network function service consumer configured to consume or use at least a service exposed by a network function service producer of the network, or the initiator entity is or comprises an intermediary entity between a network function service consumer and a network function service producer configured to expose at least the service,
- the responder entity is or comprises a network function service producer configured to expose at least a service.

According to an example embodiment, there is provided a method of (or, stated in other words, operable or for use in/by) an initiator entity of a network, the method comprising: sending an authorization request for authorization to request a service operation on a specific resource managed by a responder entity of the network, said authorization request comprising at least one resource filter specifying resource instances of the specific resource that authorization is requested for, and receiving an authorization response to the authorization request for authorization to request the service operation on the specific resource from a repository entity of the network, said authorization response comprising an authorization token comprising at least one resource filter specifying resource instances of the specific resource that authorization is granted for.

According to an example embodiment, there is provided an apparatus of (or, stated in other words, operable or for use in/by) an initiator entity of a network, the apparatus comprising: means for sending an authorization request for authorization to request a service operation on a specific resource managed by a responder entity of the network, said authorization request comprising at least one resource filter specifying resource instances of the specific resource that authorization is requested for, and means for receiving an authorization response to the authorization request for authorization to request the service operation on the specific resource from a repository entity of the network, said authorization response comprising an authorization token comprising at least one resource filter specifying resource instances of the specific resource that authorization is granted for.

According to an example embodiment, there is provided an apparatus of (or, stated in other words, operable or for use in/by) an initiator entity of a network, the apparatus comprising at least one processor, and at least one memory storing instructions that, when executed by the at least one processor, cause the apparatus at least to perform: sending an authorization request for authorization to request a service operation on a specific resource managed by a responder entity of the network, said authorization request comprising at least one resource filter specifying resource instances of the specific resource that authorization is requested for, and receiving an authorization response to the authorization request for authorization to request the service operation on the specific resource from a repository entity of the network, said authorization response comprising an authorization token comprising at least one resource filter specifying resource instances of the specific resource that authorization is granted for.

According to an example embodiment, there is provided an apparatus of (or, stated in other words, operable or for use in/by) an initiator entity of a network, the apparatus comprising: circuitry configured to send an authorization request for authorization to request a service operation on a specific resource managed by a responder entity of the network, said authorization request comprising at least one resource filter specifying resource instances of the specific resource that authorization is requested for, and circuitry configured to receive an authorization response to the authorization request for authorization to request the service operation on the specific resource from a repository entity of the network, said authorization response comprising an authorization token comprising at least one resource filter specifying resource instances of the specific resource that authorization is granted for.

According to various developments/modifications, any one of the aforementioned method-related and/or apparatus-related example embodiments may include one or more of the following features:

- the resource instances specified by the at least one resource filter in the authorization request correspond to or encompass a set of resource instances of the specific resource that the service operation is to be performed on,
- the resource instances specified by the at least one resource filter in the authorization token correspond to or encompass at least part of the resource instances specified by the at least one resource filter in the authorization request and/or correspond to or encompass a set of resource instances of the specific resource that the service operation is to be performed on,
- the method, functionality, operability or configuration comprises or enables: sending a service request for the service operation on the specific resource, said service request comprising at least one resource filter specifying the set of resource instances of the specific resource that the service operation is to be performed on,
- the service operation comprises a resource operation for causing filtering and/or selection of the set of resource instances specified by the at least one resource filter in the service request at the responder entity,
- the resource operation comprises any one of a search operation for causing search of the set of resource instances specified by the at least one resource filter in the service request at the responder entity, a read operation for causing reading of the set of resource instances specified by the at least one resource filter in the service request at the responder entity, a delete operation for causing deletion of the set of resource instances specified by the at least one resource filter in the service request at the responder entity, a modify/update operation for causing modification or update of the set of resource instances specified by the at least one resource filter in the service request at the responder entity, or a create operation for causing creation of the set of resource instances specified by the at least one resource filter in the service request at the responder entity,
- the service request comprises the authorization token, and/or the authorization request and/or the at least one resource filter in the authorization request is issued in or by a token request or discovery header,
- the at least one resource filter is based on and/or comprises content of resource instances of a set of resource instances and/or content of a resource identifier referring to resource instances of a set of resource instances,
- the content defines at least one of a group, a range or a pattern of the set of resource instances,
- the content of the resource identifier is based on or comprises a universal resource identifier variable, comprising a path and/or query parameter of a universal resource identifier of the specified resource,
- the content of resource instances is based on or comprises at least one attribute within the specified resource,
- the at least one resource filter is based on and/or comprises metadata associated with resource instances of a set of resource instances,
- the metadata defines a property of the resource instances of the set of resource instances,
- the metadata is based on or comprises an identifier of an owner or tenant of the resource instances of the set of resource instances,
- the at least one resource filter comprises or is constituted by a plurality of resource filters each specifying resource instances of the specific resource, and/or the plurality of resource filters in combination specify a set of resource instances of the specific resource that the service operation is to be performed on,
- the initiator entity is or comprises a network function service consumer configured to consume or use at least a service exposed by a network function service producer of the network, or the initiator entity is or comprises an intermediary entity between a network function service consumer and a network function service producer configured to expose at least the service,
- the responder entity is or comprises a network function service producer configured to expose at least a service,
- the repository entity is or comprises a network function repository function configured to store information relating to network functions such as a network function service consumer configured to consume or use at least a service.

According to an example embodiment, there is provided a method of (or, stated in other words, operable or for use in/by) a responder entity of a network, the method comprising: receiving a service request for a service operation on a specific resource managed by the responder entity from an initiator entity of the network, said service request comprising at least one resource filter specifying a set of resource instances of the specific resource that the service operation is to be performed on, performing the service operation on the set of resource instances based on the service request, and sending a service response to the service request for the service operation, said service response comprising a result of performing the service operation on the set of resource instances specified by the at least one resource filter.

According to an example embodiment, there is provided an apparatus of (or, stated in other words, operable or for use in/by) a responder entity of a network, the apparatus comprising: means for receiving a service request for a service operation on a specific resource managed by the responder entity from an initiator entity of the network, said service request comprising at least one resource filter specifying a set of resource instances of the specific resource that the service operation is to be performed on, means for performing the service operation on the set of resource instances based on the service request, and means for sending a service response to the service request for the service operation, said service response comprising a result of performing the service operation on the set of resource instances specified by the at least one resource filter.

According to an example embodiment, there is provided an apparatus of (or, stated in other words, operable or for use in/by) a responder entity of a network, the apparatus comprising at least one processor, and at least one memory storing instructions that, when executed by the at least one processor, cause the apparatus at least to perform: receiving a service request for a service operation on a specific resource managed by the responder entity from an initiator entity of the network, said service request comprising at least one resource filter specifying a set of resource instances of the specific resource that the service operation is to be performed on, performing the service operation on the set of resource instances based on the service request, and sending a service response to the service request for the service operation, said service response comprising a result of performing the service operation on the set of resource instances specified by the at least one resource filter.

According to an example embodiment, there is provided an apparatus of (or, stated in other words, operable or for use in/by) a responder entity of a network, the apparatus comprising: circuitry configured to receive a service request for a service operation on a specific resource managed by the responder entity from an initiator entity of the network, said service request comprising at least one resource filter specifying a set of resource instances of the specific resource that the service operation is to be performed on, circuitry configured to perform the service operation on the set of resource instances based on the service request, and circuitry configured to send a service response to the service request for the service operation, said service response comprising a result of performing the service operation on the set of resource instances specified by the at least one resource filter.

According to various developments/modifications, any one of the aforementioned method-related and/or apparatus-related example embodiments may include one or more of the following features:

- the service operation comprises a resource operation for causing filtering and/or selection of the resource instances specified by the at least one resource filter at the responder entity,
- the resource operation comprises any one of a search operation for causing search of the set of resource instances specified by the at least one resource filter at the responder entity, a read operation for causing reading of the set of resource instances specified by the at least one resource filter at the responder entity, a delete operation for causing deletion of the set of resource instances specified by the at least one resource filter at the responder entity, a modify/update operation for causing modification or update of the set of resource instances specified by the at least one resource filter at the responder entity, or a create operation for causing creation of the set of resource instances specified by the at least one resource filter at the responder entity,
- the service request comprises an authorization token, said authorization token designating authorization of the initiator entity to request the service operation on the set of resource instances specified by the resource filter,
- the method, functionality, operability or configuration (of/regarding performing) comprises or enables: processing the service operation on the set of resource instances,
- the method, functionality, operability or configuration (of/regarding performing) comprises or enables: processing the service operation on the set of resource instances based on determining that the set of resource instances matches the set of resource instances specified by the at least one resource filter, or rejecting the service operation on the set of resource instances based on determining that the set of resource instances does not match the set of resource instances specified by the at least one resource filter,
- the at least one resource filter is based on and/or comprises content of resource instances of the set of resource instances and/or content of a resource identifier referring to resource instances of the set of resource instances,
- the content defines at least one a group, a range or a pattern of the set of resource instances,
- the content of the resource identifier is based on or comprises a universal resource identifier variable, comprising a path and/or query parameter of a universal resource identifier of the specified resource,
- the content of resource instances is based on or comprises at least one attribute within the specified resource,
- the at least one resource filter is based on and/or comprises metadata associated with resource instances of the set of resource instances,
- the metadata defines a property of the resource instances of the requested set of resource instances,
- the metadata is based on or comprises an identifier of an owner or tenant of the resource instances of the set of resource instances,
- the responder entity holds a link for an association between each one of resource instances of one or more resources managed by the responder entity, comprising the specific resource, and one or more metadata records comprising or indicating metadata associated with the respective resource instances,
- the responder entity stores the one or more resources, comprising the specific resource and is connected to at least one entity storing the one or more metadata records for each one of the resource instances of one or more resources, the responder entity stores the one or more resources, comprising the specific resource and the one or more metadata records for each one of the resource instances of one or more resources, the service request for the service operation comprises an indication indicating that provision of complete or partial metadata associated with the resource instances of the set of resource instances is requested, and/or the service response to the service request comprises the requested complete or partial metadata associated with the resource instances of the set of resource instances, the at least one resource filter comprises or is constituted by a plurality of resource filters each specifying resource instances of the specific resource, and/or the plurality of resource filters in combination specify the set of resource instances of the specific resource that the service operation is to be performed on, the initiator entity and the responder entity are involved in or based on a service-based architecture of the mobile communication system, the initiator entity is or comprises a network function service consumer of the network configured to consume or use at least a service exposed by a network function service producer of the network, or the initiator entity is or comprises an intermediary entity between a network function service consumer and a network function service producer configured to expose at least the service, the responder entity is or comprises a network function service producer configured to expose at least a service.

According to an example embodiment, there is provided a method of (or, stated in other words, operable or for use in/by) a repository entity of a network, the method comprising: receiving an authorization request for authorization for an initiator entity of the network to request a service operation on a specific resource, determining, based on authorization data, that the initiator entity is authorized to request the service operation on the specific resource, said authorization data comprising mappings between initiator entities and resource instances of resources, comprising a mapping between the initiator entity and resource instances of the specific resource, and sending an authorization response to the authorization request for authorization for the initiator entity to request the service operation on the specific resource.

According to an example embodiment, there is provided an apparatus of (or, stated in other words, operable or for use in/by) a repository entity of a network, the apparatus comprising: means for receiving an authorization request for authorization for an initiator entity of the network to request a service operation on a specific resource, means for determining, based on authorization data, that the initiator entity is authorized to request the service operation on the specific resource, said authorization data comprising mappings between initiator entities and resource instances of resources, comprising a mapping between the initiator entity and resource instances of the specific resource, and means for sending an authorization response to the authorization request for authorization for the initiator entity to request the service operation on the specific resource.

According to an example embodiment, there is provided an apparatus of (or, stated in other words, operable or for use in/by) a repository entity of a network, the apparatus comprising at least one processor, and at least one memory storing instructions that, when executed by the at least one processor, cause the apparatus at least to perform: receiving an authorization request for authorization for an initiator entity of the network to request a service operation on a specific resource, determining, based on authorization data, that the initiator entity is authorized to request the service operation on the specific resource, said authorization data comprising mappings between initiator entities and resource instances of resources, comprising a mapping between the initiator entity and resource instances of the specific resource, and sending an authorization response to the authorization request for authorization for the initiator entity to request the service operation on the specific resource.

According to an example embodiment, there is provided an apparatus of (or, stated in other words, operable or for use in/by) a repository entity of a network, the apparatus comprising: circuitry configured to receive an authorization request for authorization for an initiator entity of the network to request a service operation on a specific resource, circuitry configured to determine, based on authorization data, that the initiator entity is authorized to request the service operation on the specific resource, said authorization data comprising mappings between initiator entities and resource instances of resources, comprising a mapping between the initiator entity and resource instances of the specific resource, and circuitry configured to send an authorization response to the authorization request for authorization for the initiator entity to request the service operation on the specific resource.

According to various developments/modifications, any one of the aforementioned method-related and/or apparatus-related example embodiments may include one or more of the following features: the authorization data comprise at least one of identifications, names, types or group defining patterns of the initiator entities, the authorization request comprises at least one resource filter specifying resource instances of the specific resource that authorization is requested for, and/or the authorization request comprises identification information of the initiator entity, and/or the authorization response comprises an authorization token for the initiator entity, comprising at least one resource filter specifying resource instances of the specific resource that authorization is granted for, said authorization token designating authorization of the initiator entity to request the service operation on the resource instances specified by the at least one resource filter in the authorization token, the resource instances specified by the at least one resource filter in the authorization token correspond to or encompass a set of resource instances of the specific resource that the service operation is to be performed on, the method, functionality, operability or configuration (of/regarding determining) comprises or enables: refining the service operation and/or the resource instances of the specific resource for the service operation, wherein said authorization token designates authorization of the initiator entity to request the service operation on the resource instances specified by the at least one resource filter in the authorization token with respect to the refined service operation and/or the refined resource instances of the specific resource for the service operation, the authorization request and/or the at least one resource filter in the authorization request is obtained in or by a token request or discovery header, the at least one resource filter is based on and/or comprises content of resource instances of a set of resource instances of the specific resource that the service operation is to be performed on or content of a resource identifier referring to resource instances of a set of resource instances of the specific resource that the service operation is to be performed on, the content defines at least one of a group, a range or a pattern of the set of resource instances, the content of the resource identifier is based on or comprises a universal resource identifier variable, comprising a path and/or query parameter of a universal resource identifier of the specified resource, the content of resource instances is based on or comprises at least one attribute within the specified resource, the at least one resource filter is based on and/or comprises metadata associated with resource instances of a set of resource instances of the specific resource that the service operation is to be performed on, the metadata defines a property of the resource instances of the set of resource instances, the metadata is based on or comprises an identifier of an owner or tenant of the resource instances of the set of resource instances, the at least one resource filter comprises or is constituted by a plurality of resource filters each specifying resource instances of the specific resource, and/or the plurality of resource filters in combination specify a set of resource instances of the specific resource that the service operation is to be performed on, the initiator entity and the repository entity are involved in or based on a service-based architecture of the mobile communication system, the initiator entity is or comprises a network function service consumer configured to consume or use at least a service exposed by a network function service producer of the network, or the initiator entity is or comprises an intermediary entity between a network function service consumer and a network function service producer configured to expose at least the service, the repository entity is or comprises a network function repository function configured to store information relating to network functions such as a network function service consumer configured to consume or use at least a service.

According to an example embodiment, there is provided a computer program product comprising (computer-executable) computer program code which, when the program code is executed (or run) on a computer or the program is run on a computer (e.g. a computer of an apparatus according to any or at least one of the aforementioned apparatus-related example embodiments), is configured to cause the computer to carry out the method according to any or at least one of the aforementioned method-related example embodiments.

The computer program product may comprise or may be embodied as a (tangible/non-transitory) computer-readable (storage) medium or the like, on which the computer-executable computer program code is stored, and/or the program is directly loadable into an internal memory of the computer or a processor thereof.

Further developments and/or modifications of the aforementioned example embodiments are set out in the following.

BRIEF DESCRIPTION OF THE DRAWINGS

In the following, the present disclosure will be described in greater detail by way of non-limiting examples with reference to the accompanying drawings, in which.

DETAILED DESCRIPTION

Figure 1:
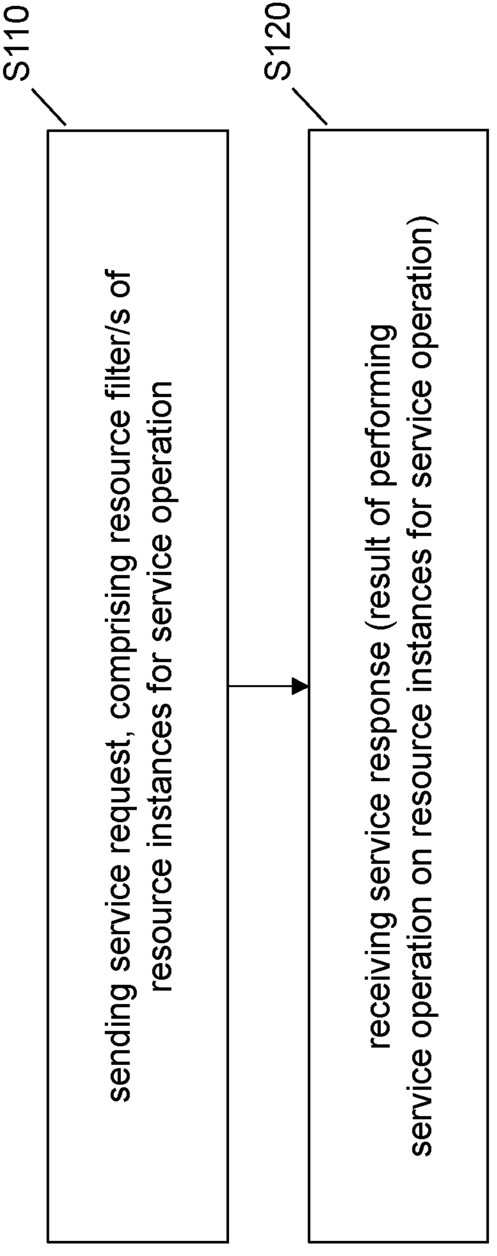
FIG. 1 shows a flowchart illustrating an example of a method or process at/by an apparatus according to at least one example embodiment.

The present disclosure is described herein with reference to particular non-limiting examples and to what are presently considered to be conceivable (examples of) embodiments. A person skilled in the art will appreciate that the present disclosure is by no means limited to these examples and embodiments, and may be more broadly applied.

It is to be noted that the following description mainly refers to mobile communication systems, and namely entities (of a core network of) mobile communication systems conforming to 3GPP standards for 5G or NR, being used as non-limiting examples. As such, the description of example embodiments given herein specifically refers to terminology which is directly related thereto. Such terminology is only used in the context of the presented non-limiting examples and embodiments, and does naturally not limit the present disclosure in any way. Rather, any other system configuration or deployment may equally be utilized as long as complying with what is described herein and/or example embodiments described herein are applicable to it.

For example, the examples of embodiments are equally applicable in entities of (a core network of) any mobile communication system, such as a 5G system and next-generation systems beyond 5G system. For example, examples of embodiments are applicable in entities of a mobile communication system conforming with Release 18 of the 3GPP standard and conforming with future releases of the 3GPP standard.

Hereinafter, various example embodiments and implementations and its aspects are described using several variants and/or alternatives. It is generally to be noted that, according to certain needs and constraints, all of the described variants and/or alternatives may be provided alone or in any conceivable combination (also including combinations of individual features of the various variants and/or alternatives). In this description, the words “comprising” and “including” should be understood as not limiting the described example embodiments and implementations to consist of only those features that have been mentioned, and such example embodiments and implementations may also contain features, structures, units, modules etc. that have not been specifically mentioned.

In the drawings, it is to be noted that lines/arrows interconnecting individual blocks or entities are generally meant to illustrate an operational coupling there-between, which may be a physical and/or logical coupling, which on the one hand is implementation-independent (e.g., wired or wireless) and on the other hand may also comprise an arbitrary number of intermediary functional blocks or entities not shown. In flowcharts or sequence diagrams, the illustrated order of operations or actions is generally illustrative/exemplary, and any other order of respective operations or actions is equally conceivable, if feasible.

As noted above, a core network of a mobile communication system may have a repository, such as a NRF of a 5GC, that is only capable of providing authorization (i.e., an authorization token) to a consumer that allows the consumer to access to an entire resource, i.e., all instances of a resource, and the consumer can then request, initiate or cause a service operation on the entire resource, i.e., all instances of the resource. However, a producer may wish to restrict access to a segment, portion or part of the entire resource that is accessible via a service, i.e., only some of the resource instances of the resource. Further, a consumer may require access to some instances of a resource but not other or all instances of a resource. Stated in other words, a consumer may be required to be enabled to request, initiate or cause an access to a segment, portion or part of an entire a resource, i.e., only some of the resource instances of a resource. A segment, portion or part of a resource is referred to herein as a subset of a resource.

According to example embodiments, in general terms, there are provided methods, apparatuses, and computer programs for enabling access to a subset of a resource (i.e., access to a segment, portion or part of a resource) that is managed by an entity of a mobile communication network and accessible by a service offered (i.e., provided by) the entity.

As used herein, a resource is an entire set of instances of the resource (i.e., all instances of the resource) and any set of instances of the resource that is not the entire resource is a subset of the resource.

As used herein, a resource refers to a dataset managed by some entity in a network (such as a core network of) a mobile communication system), and a resource instance refers to data item of the dataset. A subset of a resource refers to a group of data items of the dataset.

More specifically, a resource may be a unique element to which access (in the form of a service operation) is exposed or provided by a service, and may for example be identified using a unique URI that contains no variable values in the path or query parameters or using a non-unique URI that contains variable values in the path or query parameters. In contrast, a resource instance may be a sub-element of the unique element, and may for example be identified using an URI with a unique combination of variable parts of the URI (i.e., variable values in the path and/or query parameters). A subset of a resource may be a group of sub-elements of the resource.

As an example, an UDR may store and manage subscription data of subscribers a network operator of a mobile communication network. The subscription data for all subscribers may be a resource and subscription data for an individual subscriber may be a resource instance. A subset of a resource may be a subscription data of any set of group of subscribers. Accordingly, access to a resource may mean access to subscription data of subscribers, while access to a resource instance may mean access to subscription data of one subscriber.

As another example, an UDR may store and managed application data of multiple UEs. The application data for all UEs managed by the UDR may be a resource and the application data for an individual UE may be a resource instance. A subset of a resource may be application data of a group of UEs. Accordingly, access to the resource may mean access to the application data of all UEs, while access to a resource instance may mean access to application data of one UE.

FIG. 1 shows a flowchart illustrating an example of a method or process according to at least one example embodiment. The method or process of FIG. 1 is a method or process of (or, stated in other words, operable or for use in/by) an initiator entity, or an element, function or entity of similar/comparable functionality or operability, in/of a network, e.g., a (core) network of a mobile communication system. Such initiator entity may for example be or relate to a (NF service) consumer or an intermediary entity between a (NF service) consumer and a (NF service) producer, while the referenced responder entity may for example be or relate to a (NF service) producer, without being limited accordingly.

As shown in FIG. 1, the method or process comprises an operation (S110) of sending a service request for a service operation on a specific resource managed by a responder entity of the network, said service request comprising at least one resource filter specifying a set of resource instances of the specific resource that the service operation is to be performed on, and an operation (S120) of receiving a service response to the service request from the responder entity, said service response comprising a result of performing the service operation on the set of resource instances specified by the at least one resource filter.

Although not shown in FIG. 1, according to an at least one example embodiment, the method or process may comprise (before or after the operations S110 and S120) an operation of sending an authorization request for authorization for the initiator entity to request a service operation on the specific resource to a repository entity of the network, and an operation of receiving an authorization response to the authorization request for authorization for the initiator entity to request a service operation on the specific resource from the repository entity. Based on such operations, any operations relating to a service operation, such as the operations S110 and S120, may be performed upon authorization of the initiator entity by the repository entity. In this regard, the authorization request may comprise at least one resource filter specifying resource instances of the specific resource that authorization is requested for, and/or the authorization request may comprises identification information of the initiator entity, and the authorization response may comprise an authorization token for the initiator entity, comprising at least one resource filter specifying resource instances of the specific resource that authorization is granted for, said authorization token designating authorization of the initiator entity to request a service operation on the resource instances specified by the at least one resource filter in the authorization token.

In this regard, according to at least one example embodiment, the method or process may comprise caching of an authorization token (comprising at least one resource filter) by/at the initiator entity, e.g., upon (pre-) configuration or reception thereof. The authorization token (and it's at least one resource filter) may be cached, for a predetermined, e.g. during a validity of the authorization token (which may be indicated therein/thereby), until a predetermined event or condition, or the like. Afterwards, a cached authorization token may be deleted or discarded. Further, the method or process may comprise checking availability of an (applicable) authorization token, i.e., a cached authorization token, the at least one resource filter of which is suitable for a presently needed or desired operation. For example, when the initiator entity wants to access a resource using a specific resource filter, it can check whether it presently has, e.g. caches, an authorization token for/with this specific resource filter, and it can use the cached authorization token accordingly (without having to send a corresponding authorization request so as to request and receive an applicable authorization token), or otherwise it sends a corresponding authorization request so as to request and receive an applicable authorization token. Thereby, an authorization request may be sent only if required.

Figure 2:
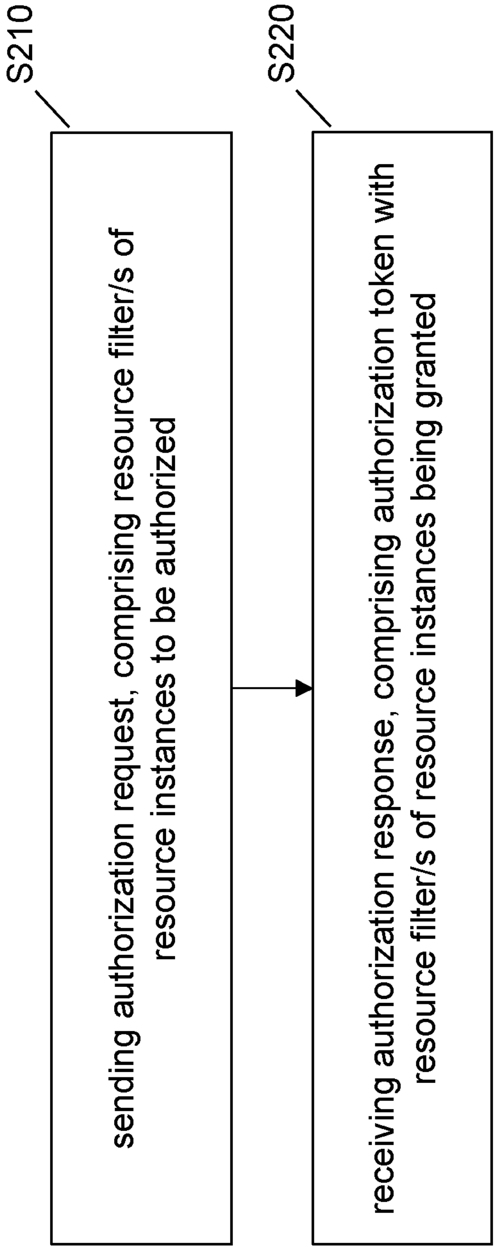
FIG. 2 shows a flowchart illustrating an example of a method or process at/by an apparatus according to at least one example embodiment.

FIG. 2 shows a flowchart illustrating an example of a method or process according to at least one example embodiment. The method or process of FIG. 2 is a method or process of (or, stated in other words, operable or for use in/by) an initiator entity, or an element, function or entity of similar/comparable functionality or operability, in/of a network, e.g., a (core) network of a mobile/wireless communication system. Such initiator entity may for example be or relate to a (NF service) consumer or an intermediary entity between a (NF service) consumer and a (NF service) producer, while the referenced responder entity may for example be or relate to a (NF service) producer, and the referenced repository entity may for example be or relate to a network function repository function (NRF), without being limited accordingly.

As shown in FIG. 2, the method or process comprises an operation (S210) of sending an authorization request for authorization to request a service operation on a specific resource managed by a responder entity of the network, said authorization request comprising at least one resource filter specifying resource instances of the specific resource that authorization is requested for, and an operation (S220) of receiving an authorization response to the authorization request for authorization to request the service operation on the specific resource from a repository entity of the network, said authorization response comprising an authorization token comprising at least one resource filter specifying resource instances of the specific resource that authorization is granted for.

In this regard, according to an at least one example embodiment, the resource instances specified by the at least one resource filter in the authorization request may correspond to or encompass a set of resource instances of the specific resource that the service operation is to be performed on, and/or the resource instances specified by the at least one resource filter in the authorization token may correspond to or encompass at least part of the resource instances specified by the at least one resource filter in the authorization request and/or may correspond to or encompass a set of resource instances of the specific resource that the service operation is to be performed on.

According to at least one example embodiment, the method or process may comprise caching of an authorization token (comprising at least one resource filter) by/at the initiator entity, e.g., upon (pre-)configuration or reception thereof. Such caching may be uphold, i.e. the authorization token (and it's at least one resource filter) may be cached, for a predetermined, e.g. during a validity of the authorization token (which may be indicated therein/thereby), until a predetermined event or condition, or the like. Afterwards, a cached authorization token may be deleted or discarded. Further, the method or process may comprise checking availability of an (applicable) authorization token, i.e., a cached authorization token, the at least one resource filter of which is suitable for a presently needed or desired operation. For example, when the initiator entity wants to access a resource using a specific resource filter, it can check whether it presently has, e.g. caches, an authorization token for/with this specific resource filter, and it can use the cached authorization token accordingly (without having to send a corresponding authorization request so as to request and receive an applicable authorization token), or otherwise it sends a corresponding authorization request so as to request and receive an applicable authorization token. Thereby, an authorization request may be sent only if required.

Figure 3:
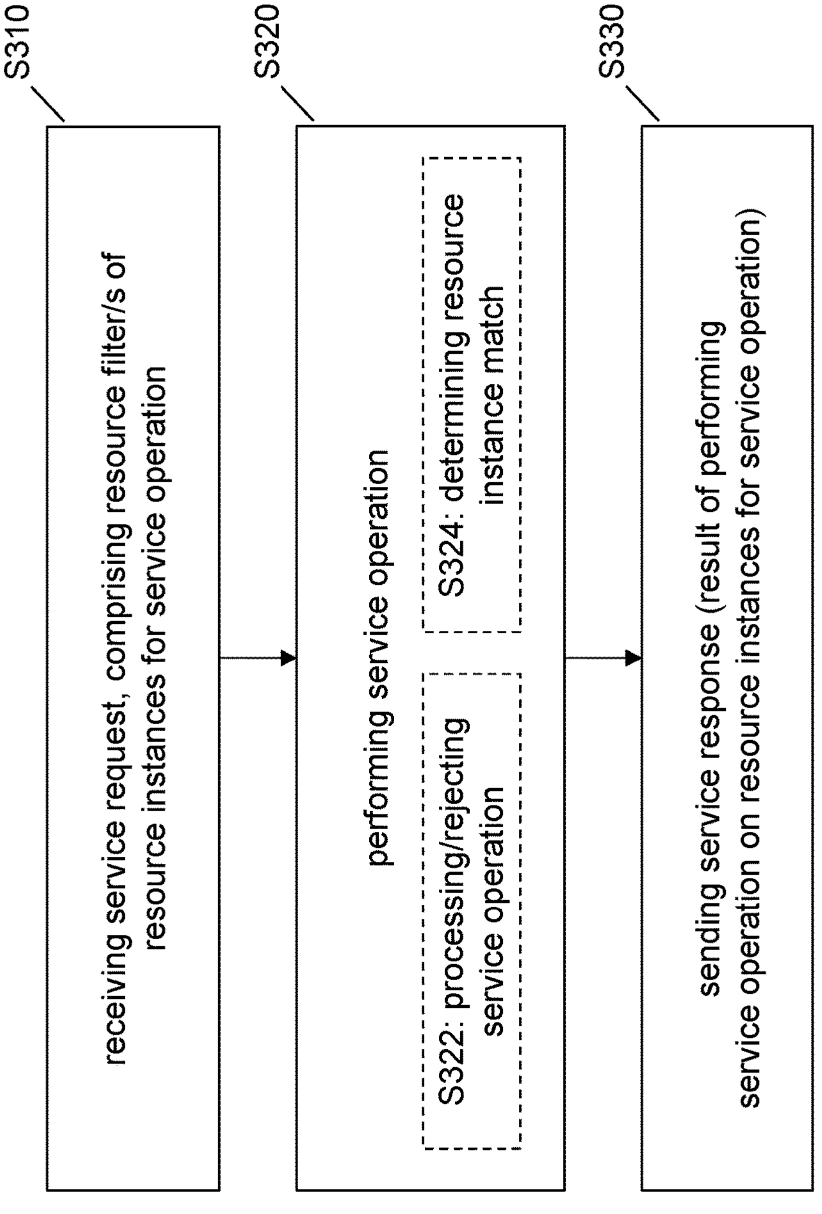
FIG. 3 shows a flowchart illustrating an example of a method or process at/by an apparatus according to at least one example embodiment.

FIG. 3 shows a flowchart illustrating an example of a method or process according to at least one example embodiment. The method or process of FIG. 3 is a method or process of (or, stated in other words, operable or for use in/by) a responder entity, or an element, function or entity of similar/comparable functionality or operability, in/of a network, e.g., a (core) network of a mobile communication system. Such responder entity may for example be or relate to a (NF service) producer, while the referenced initiator entity may for example be or relate to a (NF service) consumer or an intermediary entity between a (NF service) consumer and a (NF service) producer, without being limited accordingly.

As shown in FIG. 3, the method or process comprises an operation (S310) of receiving a service request for a service operation on a specific resource managed by the responder entity from an initiator entity of the network, said service request comprising at least one resource filter specifying a set of resource instances of the specific resource that the service operation is to be performed on, an operation (S320) of performing the service operation on the set of resource instances based on the service request, and an operation (S330) of sending a service response to the service request for the service operation, said service response comprising a result of performing the service operation on the set of resource instances specified by the at least one resource filter.

In this regard, according to an at least one example embodiment, the service request may include an authorization token which designates authorization of the initiator entity to request the service operation on the set of resource instances specified by the at least one resource filter. Thereby, the responder entity may be notified or informed of the corresponding authorization of the initiator entity.

As indicated by dashed-line boxes in FIG. 3, according to an at least one example embodiment, the method or process, i.e., the service operation performing operation, may further comprise an operation (S322) of processing or rejecting the service operation on the set of resource instances. Also, the method or process, i.e., the service operation performing operation, may further comprise an operation (S324) of determining whether the set of resource instances matches the set of resource instances specified by the at least one resource filter. Based thereon, the operation S322 may comprise processing the service operation on the set of resource instances based on determining that the set of resource instances matches the set of resource instances specified by the at least one resource filter, or rejecting the service operation on the set of resource instances based on determining that the set of resource instances does not match the set of resource instances specified by the at least one resource filter.

Figure 4:
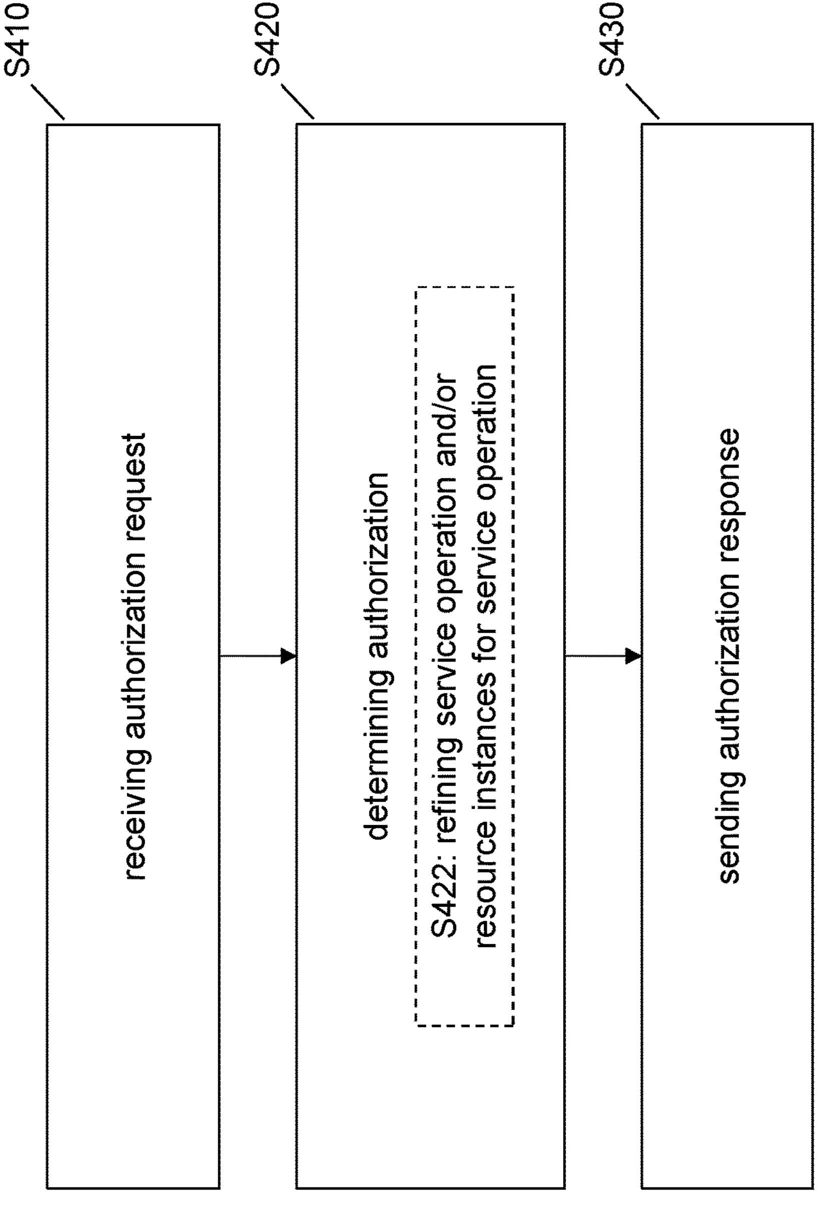
FIG. 4 shows a flowchart illustrating an example of a method or process at/by an apparatus according to at least one example embodiment.

FIG. 4 shows a flowchart illustrating an example of a method or process according to at least one example embodiment. The method or process of FIG. 4 is a method or process of (or, stated in other words, operable or for use in/by) a repository entity, or an element, function or entity of similar/comparable functionality or operability, in/of a network, e.g., a (core) network of a mobile communication system. Such repository entity may for example be or relate to a network function repository function (NRF), while the referenced initiator entity may for example be or relate to a (NF service) consumer or an intermediary entity between a (NF service) consumer and a (NF service) producer, without being limited accordingly.

As shown in FIG. 4, the method or process comprises an operation (S410) of receiving an authorization request for authorization for an initiator entity of the network to request a service operation on a specific resource, an operation (S420) of determining, based on authorization data, that the initiator entity is authorized to request the service operation on the specific resource, said authorization data comprising mappings between initiator entities and resource instances of resources, comprising a mapping between the initiator entity and resource instances of the specific resource, and an operation (S430) of sending an authorization response to the authorization request for authorization for the initiator entity to request the service operation on the specific resource.

In this regard, according to an at least one example embodiment, the authorization request may comprise at least one resource filter specifying resource instances of the specific resource that authorization is requested for, and/or the authorization request may comprise identification information of the initiator entity, and/or the authorization response may comprise an authorization token for the initiator entity, comprising at least one resource filter specifying resource instances of the specific resource that authorization is granted for, said authorization token designating authorization of the initiator entity to request the service operation on the resource instances specified by the at least one resource filter in the authorization token.

As indicated by a dashed-line box in FIG. 4, according to an at least one example embodiment, the method or process, i.e., the authorization determining operation, may further comprise an operation (S422) of refining the service operation and/or the resource instances of the specific resource for the service operation. Based thereon, the authorization token may designate authorization of the initiator entity to request the service operation on the resource instances specified by the at least one resource filter in the authorization token with respect to the refined service operation and/or the refined resource instances of the specific resource for the service operation. That is, the authorization token may (be configured to) refine (or, stated in other words, restrict, confine or constrain) the service operation and/or the resource instances of the specific resource for the service operation.

According to various example embodiments, a service operation (as e.g., mentioned above) may be or comprise any resource operation for causing filtering and/or selection of resource instances, namely the set of resource instances specified by the at least one resource filter in the related service request, at the entity managing the specific resource and its resource instances. Such filtering and/or selection may more generally be regarded as accessing of resource instances, and a service or resource operation may also be understood or referred to as access operation for causing access to the set of resource instances specified by the at least one resource filter in the related service request, at the entity managing the specific resource and its resource instances. Such resource (or access) operation may comprise various operations, such as e.g. a search operation which causes (or effects) search of the specified resource instances, a read operation which causes (or effects) reading of the specified resource instances, a delete operation which causes (or effects) deletion of the specified resource instances, a modify/update operation which causes (or effects) modification or update of the specified resource instances, or a create operation which causes (or effects) creation of the specified resource instances.

According to various example embodiments, operations of sending or receiving (as used herein) may comprise actual transmission or communication operations, i.e. the actual sending or receiving of associated messages or signals, but may also comprise related processing operations, i.e. the preparing or generating of associated messages or signals before sending and/or the handling/processing of associated messages or signals after receiving. For example, the sending of a service/authorization request or response from an entity may comprise the generating and/or issuing thereof in the entity, in addition to its transmission/communication, and the receiving of a service/authorization request or response at/by an entity may comprise the obtaining and/or processing thereof in the entity, in addition to its reception/communication.

Figure 5:
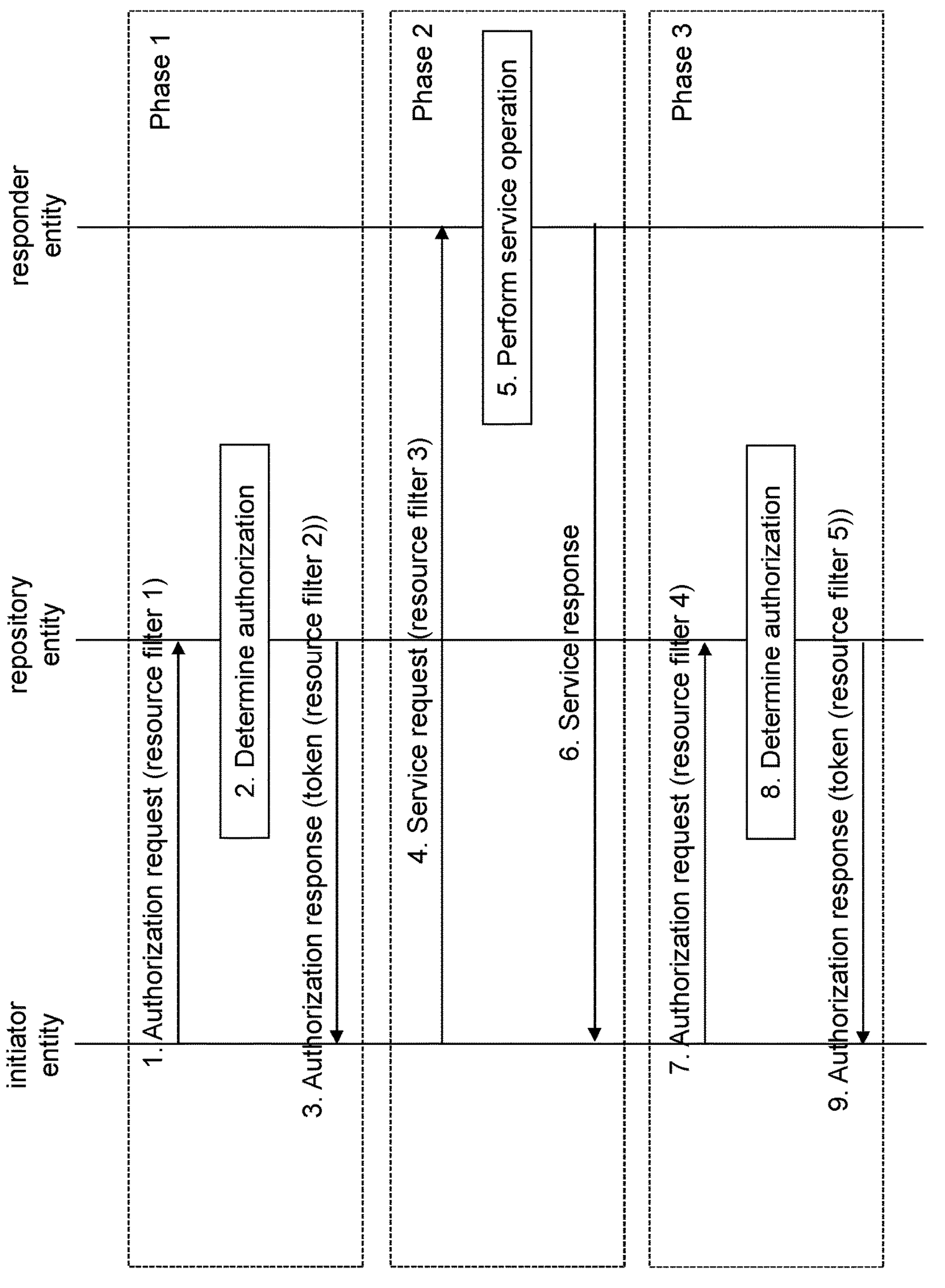
FIG. 5 shows a sequence diagram illustrating an example of a procedure according to at least one example embodiment.

FIG. 5 shows a sequence diagram illustrating an example of a procedure according to at least one example embodiment. In the example of FIG. 5, the initiator entity, the repository entity and the responder entity may operate in accordance with one or more of the example methods illustrated in FIGS. 1 to 4, respectively.

The sequence of operations is (logically) divided into three phases, such division merely serving for the purpose of explanation and illustration. It is to be noted that the individual phases are generally self-contained and mutually independent but arbitrarily combinable. Flows/sequences according to various example embodiments may involve Phase 1 only, Phase 2 only, Phase 3 only, Phase 1 followed by Phase 2, Phase 1 followed by Phases 2 and 3, and Phase 2 followed by Phase 3.

As shown in FIG. 5, in Phase 1, the initiator entity (potentially upon determination of a corresponding need or initiation) sends an authorization request to the repository entity for requesting authorization for a service operation, optionally including a resource filter (denoted as resource filter 1) specifying resource instances for authorization. For example, the initiator entity may request authorization of resource instances A and B of a resource managed by the responder entity for a search operation. Based upon the authorization request, the repository entity determines authorization of the initiator entity, i.e., whether or not the initiator entity is authorized to request a search operation on resource instances A and B. Such determination may be based on authorization data of/at the repository entity, which defines a mapping between authorized/permitted pairs of sets of service operations and resource instances for initiator entities. As a result of such determination, the repository entity may determine that the initiator entity is authorized to request a search operation on resource instances A and B, or may determine that the initiator entity is authorized to request a search operation on resource instance A only, for example. Hence, the repository entity may accept the initiator entity's request or refine, i.e., partly accept the initiator entity's request, thus refining the requested resource instances and/or the requested service operation. Then, assuming authorization, the repository entity sends an authorization response to the initiator entity for authorizing the initiator entity accordingly, including an authorization token comprising a resource filter (denoted as resource filter 2) specifying granted resource instances. For example, the repository entity may give authorization to the initiator entity to request a search operation on resource instances A and B by making resource filter 2 specifying resource instances A and B, or may determine that the initiator entity is authorized to request a search operation on resource instance A only by making resource filter 2 specifying resource instance A, for example.

As shown in FIG. 5, in Phase 2, the initiator entity (potentially upon determination of a corresponding need or initiation) sends a service request for a service operation to the responder entity, including a resource filter (denoted as resource filter 3) specifying requested resource instances for the service operation (which may optionally be included in authorization token, if present). For example, the initiator entity may request a delete operation on resource instance C of a resource managed by the responder entity. In the case that Phase 1 preceded Phase 2, the initiator entity may request a search operation on resource instances A and B or resource instance A of a resource managed by the responder entity, wherein the service request comprises the authorization token of the authorization response in Phase 1 or (the resource instance/s specified by) resource filter 3 in the service request corresponds to (the resource instance/s specified by) resource filter 2 in (the authorization token of) the authorization response in Phase 1. Then, the responder entity performs the service operation based on the service request from the initiator. In this regard, the responder entity (potentially upon determination of a resource instance match) processes the requested service operation, e.g., by causing deletion of resource instance C based on the aforementioned delete request, or by causing search of resource instances A and B or resource instance A based on a respective one of the aforementioned search requests. As a result of such performing, the responder entity sends a service response to the initiator entity, including a result of performing the requested service operation. Such result may comprise an operation result, such as an indication of deletion of resource instance C or (the contents of) resource instances A and/or B, or an indication of rejection of the requested service operation.

As shown in FIG. 5, in Phase 3, whether or not Phases 1 and/or 2 preceded Phase 3, the initiator entity (potentially upon determination of a corresponding need or initiation) sends an authorization request to the repository entity for requesting authorization for a service operation, optionally including a resource filter (denoted as resource filter 4) specifying resource instances for authorization. For example, the initiator entity may request authorization of resource instances D, E and F of a resource managed by the responder entity for a create operation. Based upon the authorization request, the repository entity determines authorization of the initiator entity, i.e., whether or not the initiator entity is authorized to request a create operation on resource instances D, E and F. Such determination is basically similar to that described above for Phase 1, and thus reference is made to the above description for simplification. Assuming authorization, the repository entity sends an authorization response to the initiator entity for authorizing the initiator entity accordingly, including an authorization token comprising a resource filter (denoted as resource filter 5) specifying granted resource instances. For example, the repository entity may give authorization to the initiator entity to request a create operation on resource instances D, E and F by making resource filter 5 specifying resource instances D, E and F, or may determine that the initiator entity is authorized to request a create operation on resource instances E and F only by making resource filter 5 specifying resource instances E and F, for example.

According to various example embodiments, a resource filter may take any form or type and/or be included in or associated with any part of a service or authorization request/response, as long as it can specify a set of resource instances of a specific resource, on which a related (requested) service operation or authorization is to be performed. In this regard, it can be said that a resource filter specifies a common property or characteristic of a requested set of resource instances, such as content or attribute, which the requested resource instances have in common, a reference or identifier for referencing or identifying the requested resources, or the like.

As a first example, the resource filter may be based on and/or comprise content of resource instances of the set of resource instances, i.e., resource content, and/or content of a resource identifier referring to resource instances of the set of resource instances, i.e., identifier content. Thereby, the shared property(ies) and/or characteristic(s) of the requested resource instances (or set of resource instances), i.e., a part, parameter, set, range, pattern, etc. of or based on the resource and/or identifier content, can be specified so as to define/establish a corresponding level of filtering and/or selection for the related (requested) service operation or authorization. Accordingly, corresponding resource filters can be applied with respect to resource and/or identifier content.

In this regard, the content may define at least one of a group, a range or a pattern of resource instances, and/or the content may be based on or comprise at least one of a resource identifier variable, such as a universal resource indicator (URI) variable, an attribute or a combination of a resource identifier variable and an attribute. That is, resource filters may be based on one or more of a resource URI variable (such as a path and/or query variable), an attribute within the resource or resource instances, or any other approach of specifying a (sub-)set of resource instances. While resource filters may take several forms, the following examples are given for illustrative purposes without restriction thereto:

Ranges of resource IDs (URI variables with range values)
  e.g. IMSI="234150000000000"-"234159999999999"
Patterns of resource IDs (URI variables with patterns to match against values)
  e.g. UEID="imsi-23415*"
Ranges of resource attribute values
  e.g. session-ID="1234500000"-"1234599999"
Combinations of values of resource IDs
  e.g. realmId="realm-123" && storageId="storage-333" && recordId="nf1-*"
Combinations of values of resource attributes
  e.g. anyUeId="true" && snssai="mySlice1"

In this regard, resource filters may also specify the 'location' of the resource URI variable or attribute they relate to, e.g. by specifying a URI pattern or a JSON pointer to the relevant attribute.

As a second example, the resource filter may be based on and/or comprise metadata associated with resource instances of the requested set of resource instances, i.e. (associated) metadata. Thereby, the shared property(ies) and/or characteristic(s) of the requested resource instances (or set of resource instances) can be specified so as to define/establish a corresponding level of filtering and/or selection for the related (requested) service operation or authorization, even in case of the lack/absence of (or the desire to avoid using) any shared property(ies) and/or characteristic(s) in the resource and/or identifier content as such. Accordingly, corresponding resource filters can be applied more generally, even without respect to resource and/or identifier content.

In this regard, the metadata may define a property or characteristic of the resource instances of the requested set of resource instances, which is not contained in their content and/or their identifier's content, and/or the metadata may be based on or comprise an owner or tenant of the resource instances of the requested set of resource instances. That is, the resource filters may be based on any (freely/flexibly defined) property(ies) and/or characteristic(s) relating to the resource or resource instances. While resource filters may take several forms, the following examples are given for illustrative purposes without restriction thereto:

Specific resource feature, quality or capability (of/for resource instance) e.g., tenant-ID="tenant-X"
Resource instance creator ID
Resource instance creation time
Resource instance storage type
Resource instance storage size (or size range)

According to various example embodiments, a resource filter may comprise or be constituted by a plurality of resource filters, and/or a service or authorization request/response may comprise a plurality of resource filters. If so, the plurality of resource filters may together (i.e., in combination) specify a set of resource instances of a specific resource, on which a related (requested) service operation or authorization is to be performed. Such plural resource filter may be of the same form or type or of different forms and types. For example, a resource filter may comprise a first (sub-) resource filer using an attribute or URI path variables (i.e., a resource filter based on resource or resource identifier content) and a second (sub-) resource filter using metadata.

In the following, various use cases or applications of example embodiments are explained with regard to (i.e., assuming implementation in/for) a core network of a mobile communication system, such as a 5GC having a service-based architecture, as an example. Namely, a consumer (i.e., a NF service consumer), or intermediary entity between a (NF service) consumer and a (NF service) producer, is exemplarily adopted/assumed as an initiator entity, and a producer (i.e., a NF service producer) is exemplarily adopted/assumed as a responder entity. As the case may be, a network function repository function (NRF) is exemplarily adopted/assumed as a repository entity. It is to be noted that such explanations are merely of exemplary nature and are made for illustrative purposes only, without any limitation.

As explained above, any communication between a consumer and a producer can be a direct communication or an indirect communication via one or more intermediary entities, such as intermediate network functions (NFs), service communication proxies (SCP), or the like. Accordingly, even if not showing or mentioning any intermediary entities in the subsequent explanation, it is to be noted that any mentioned communication or message can typically be realized in a direct or indirect manner.

Next, there is described an exemplary use case of resource access in a core network of a mobile communication system including a producer, a consumer and a NRF as a repository. Resource access stands for an access operation for accessing resource instances, any may be any one of the aforementioned service operations.

In the description of this exemplary use case of resource access, any kind of resource filter can be applied/adopted. That is, when reference is made to a resource filter, this may be a resource filter based on resource or identifier content (i.e., a content-based resource filter) or based on metadata (i.e., a metadata-based resource filter).

Figure 6:
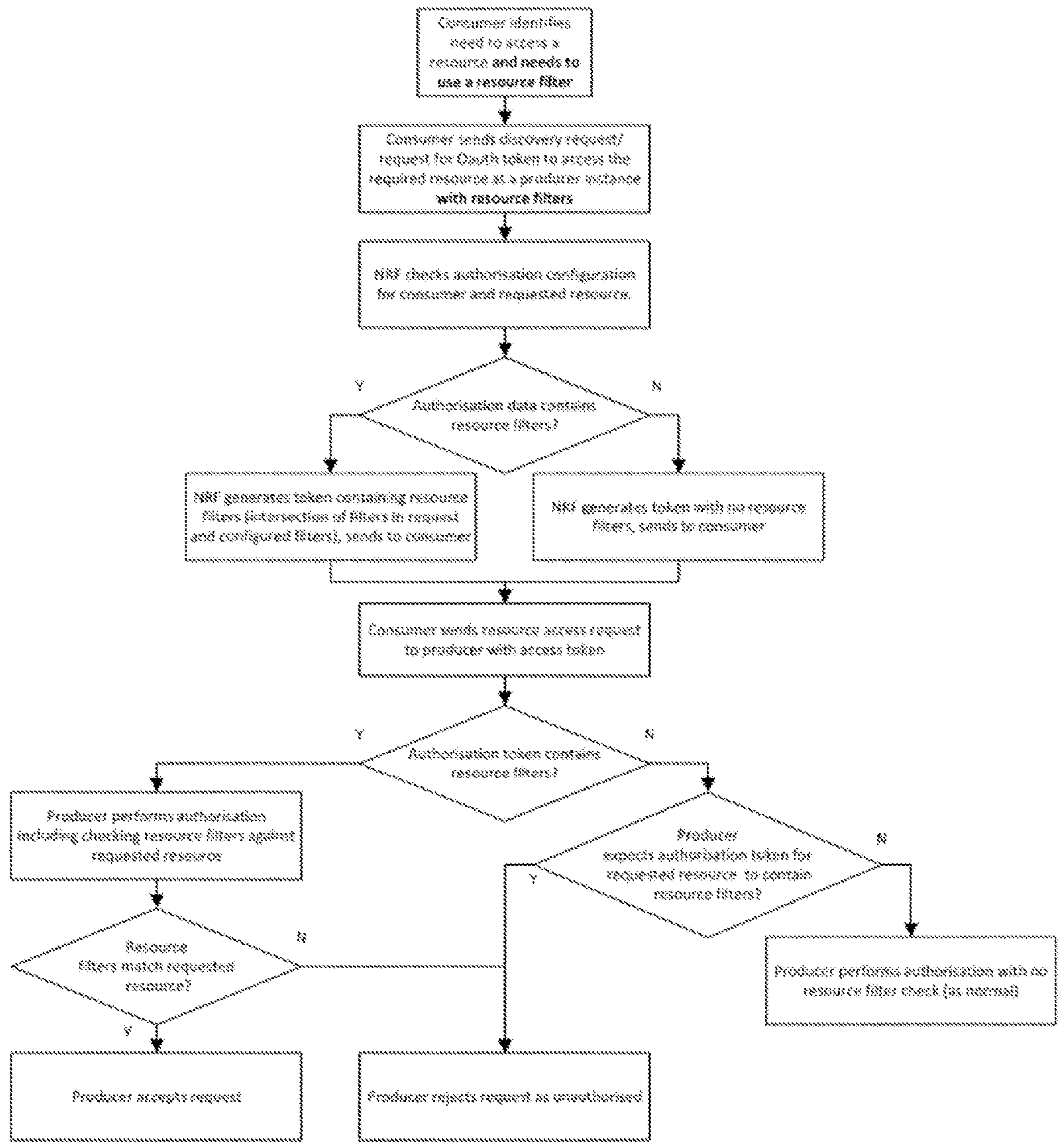
FIG. 6 shows a flowchart illustrating an example of a method or process in a mobile communication system according to at least one example embodiment.

FIG. 6 shows a flowchart illustrating an example of a method or process in a mobile communication system according to at least one example embodiment. The example of FIG. 6 represents actions performed by a consumer, a NEF, and a producer of a core network of a mobile communication system, after the consumer issues/sends an authorization request for requesting an authorization token, wherein the authorization request includes a resource filter.

When the consumer determines or identifies a need or desire to access a resource managed by the producer, which is configured to have access control using resource filters (i.e., has restricted access), the consumer knows that a resource filter is to be included in the resource access request sent to the producer. Then, the consumer requests an authorization token from the NRF by issuing/sending an authorization request (such as a discovery request/header, an OAuth token request, or the like) including a corresponding resource filter for the requested resource. Such a request may be sent only if the consumer does not have, e.g., cached, a suitable (and non-expired) authorization (e.g., OAuth) token for the resource filter for the requested resource. If the consumer has, e.g., cached, a suitable (and non-expired) authorization (e.g., OAuth) token for the resource filter for the requested resource, the consumer may omit such request, and may continue with sending a service request using the available authorization (e.g., OAuth) token including its resource filter(s).

Upon receipt of the authorization request, the NRF checks its authorization data/mapping (configuration) to see if the consumer is allowed to access the requested resource managed by the producer, i.e., the requested resource instances, as specified with the resource filter. If the consumer is allowed to access the requested resource managed by the producer, an authorization token (such as an OAuth token) is (generated and) granted, which includes a corresponding resource filter. Namely, the authorization token contains a (security) claim including the corresponding resource filter. Then, the NRF issues/sends an authorization response that includes the (generated and) granted authorization token to the consumer. The NRF's authorization data indicates which consumers are allowed or permitted to access the resource managed by the producer. The NRF's mapping (configuration) is a mapping between the resource managed by the producer and consumers which are allowed or permitted to access the resource managed by the producer.

Upon receipt of the authorization response, the consumer issues/sends the resource access request that includes the authorization token received in the authorization response to the producer. Further, the consumer may cache the received authorization (e.g., OAuth) token, e.g., for its validity time, for later use.

Upon receipt of the resource access request, including a corresponding resource filer, the producer checks if access to the requested resource is to be allowed or rejected. In this regard, the producer checks the requested resource against any (security) claim including a resource filter, which is included in the authorization token. In this regard, the producer may first check whether the authorization token included in the resource access request includes a resource filter. If the authorization token includes a resource filter, the producer performs authorization, and accepts the request so as to allow resource access if the resource filter matches the requested resource, or rejects the request so as to not allow resource access if the resource filter does not match the requested resource. If the authorization does not include a resource filter, the consumer checks whether or not presence of a resource filter is expected (i.e., whether or not the requested resource is configured to have access control using resource filters (i.e. has restricted access)), and rejects the request so as to not allow resource access if a resource filter is expected, and performs authorization as usual, i.e. without a resource filter, if a resource filter is not expected.

As an example of the actions of the method or process illustrated in FIG. 6, the consumer may want to access a resource "subscription data" for IMSI=1 or tenant=MVNO X, i.e., resource instances of IMSI=1 or tenant=MVNO X. Then, the consumer adds as the resource filter IMSI=1 (i.e., an example of a content-based resource filter) or tenant=MVNO X (i.e., an example of a metadata-based resource filter) to the authorization request, and the NRF checks whether the consumer is allowed to access the resource instance IMSI=1 or the resource instance tenant=MVNO X in the resource "subscription data". If so, the NRF adds a corresponding resource filter, namely IMSI=1 (i.e., an example of a content-based resource filter) or tenant=MVNO X (i.e., an example of a metadata-based resource filter), to an OAuth token in the authorization response. Based on this OAuth token included in the resource access request received from the consumer, the producer checks whether or not the consumer is allowed to access the resource instance IMSI=1 or the resource instance tenant=MVNO X in the resource "subscription data".

Figure 7:
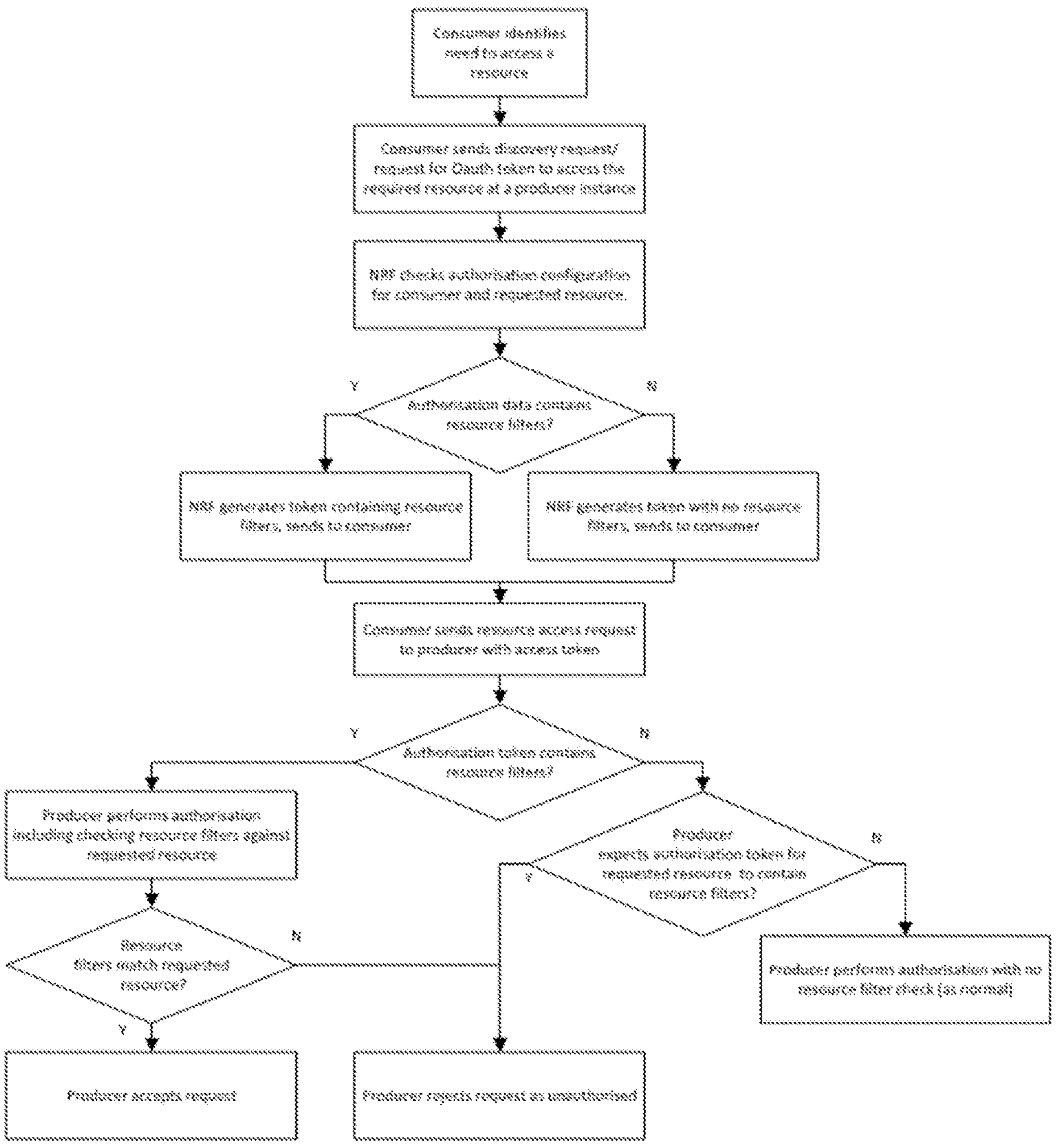
FIG. 7 shows a flowchart illustrating an example of a method or process in a mobile communication system according to at least one example embodiment.

FIG. 7 shows a flowchart illustrating an example of a method or process in a mobile communication system according to at least one example embodiment. The example of FIG. 7 represents actions performed by a consumer, a NEF, and a producer of a core network of a mobile communication system, after the consumer issues an authorization request for requesting an authorization token, the authorization request includes identification information of the consumer (but no resource filter).

When the consumer determines or identifies a need or desire to access a resource at the producer, which may be any resource which is or is not configured to have access control using resource filters (i.e. has restricted access), the consumer requests an authorization token from the NRF by issuing/sending an authorization request (such as e.g. a discovery request/header, an OAuth token request, or the like) including its identification information (which may comprise one or more of consumer ID, consumer name, consumer type, or the like) and the requested resource. Such request may be issued only if the consumer does not have, e.g., cached, a suitable (and non-expired) authorization (e.g., OAuth) token for the resource filter for the requested resource. If the consumer has, e.g., cached, a suitable (and non-expired) authorization (e.g., OAuth) token for the resource filter for the requested resource, the consumer may omit such request, and may continue with sending a service request using the available authorization (e.g., OAuth) token including its resource filter/s.

Upon receipt of the authorization request, the NRF checks its authorization data/mapping (configuration) to see if the consumer is allowed access to the requested resource managed by the producer. If the NRF is configured with resource filters applicable to the consumer requesting access to this resource, the NRF (generates and) grants an authorization token (such as an OAuth token) including one or more appropriate resource filters. Namely, the authorization token contains a (security) claim including one or more corresponding resource filters. Then, the NRF issues/sends an authorization response that includes the (generated and) granted authorization token to the consumer.

It is to be noted that since the consumer does not specify through the use of resource filters any set of resource instances of a resource for which authorization is requested (in the authorization request), the NRF shall add to the authorization token all resource filters that are applicable for the given consumer.

Upon receipt of the authorization response, the consumer issues/sends the resource access request including the authorization token included in the received authorization response to the producer. Further, the consumer may cache the received authorization (e.g., OAuth) token, e.g., for its validity time, for later use.

Upon receipt of the resource access request, the producer checks if access to the requested resource is to be allowed or rejected. In this regard, the producer checks the requested resource against any (security) claim including a resource filter, which is included in the authorization token. For the remaining processing, reference is made to the corresponding description of FIG. 6, which is basically equivalent.

As an example of the operations of the example method or process illustrated in FIG. 7, the consumer may want to access a resource "subscription data". Then, the consumer adds its ID, name or type to the authorization request, and the NRF checks whether the consumer is allowed to access the resource "subscription data" or which resource instances thereof. In the case that the consumer is allowed to access the resource instance IMSI=1 or the resource instance tenant=MVNO X, the NRF adds a corresponding resource filter, namely IMSI=1 (i.e., an example of a content-based resource filter) or tenant=MVNO X (i.e., an example of a metadata-based resource filter), to an OAuth token in the authorization response. Based on this OAuth token in the resource access request from the consumer, the producer checks whether or not the consumer is allowed to access the resource instance IMSI=1 or the resource instance tenant=MVNO X in the resource "subscription data".

When comparing the two methods or processes exemplified in FIGS. 6 and 7, the following can be considered. In the method or process exemplified in FIG. 6, the consumer issues/sends an authorization request including a resource filter (as exemplified in FIG. 6) may be pertinent (or even required) in cases where an intermediary entity is involved (or even required) to authorize access by/for its consumer, e.g., the case of an AF accessing UCMF through NEF (as exemplified in FIG. 15). In this case, for example, the NEF assigns a resource filter for the manufacturer ID associated with the AF (as configured in the NEF) and hence instructs the NRF to only include that specific resource filter, which is applicable to the AF when generating the authorization (e.g., OAuth) token, rather than all resource filters applicable to the NEF. In the method or process exemplified in FIG. 7, the consumer issues/sends an authorization request including an indication that no resource filter (as exemplified in FIG. 7) may be pertinent or beneficial, since it does not require the consumer to (determine/identify and thus) know that or when a resource filter should be included in the authorization request, such as the authorization (e.g., OAuth) token request. Thereby, the complexity and/or load of the consumer can be reduced, and the authorization configuration can be isolated to/at NRF, for example. Accordingly, there may be use cases or applications in which the actions of the method or process exemplified in FIG. 7 are preferred (or even required), and there may be use cases or applications in which actions of the methods or processes of the exemplified in FIG. 6 are preferred.

According to an example embodiment, an initiator entity or consumer may have or may obtain knowledge on whether a resource (managed by a producer) is or is not configured to have access control using resource filters (i.e., has restricted access). This may be accomplished by (e.g., acquiring, inquiring, etc.) corresponding information held in a repository entity, e.g., an NRF. A responder entity or producer may (cause to) register corresponding information at/in a repository entity, e.g., an NRF, namely information indicating whether a resource (at the producer) is or is not configured to have access control using resource filters (i.e., has restricted access). In this regard, a responder entity or producer may send NFRegister and/or NFUpdate message to the NRF to register and/or update the NFProfile of the producer stored therein to indicate support for "resource filters". Alternatively, a repository entity (e.g., an NRF) may cause registration of corresponding information, e.g., in/by communication (with an application server) for an actual authorization process if this is based on any dynamic data, e.g., in NFProfile/NFServices profiles, or provided for such communication by local configuration, etc.

In view of the above descriptions of the example methods or processes illustrated in FIGS. 6 and 7, it is to be noted that the thus presented descriptions and/or illustrations shall not define any limitation on certain implementations, such as any specific model/s (of communication flows) according to 3GPP specifications.

For example, Model D (e.g., where a SCP is between the consumer and the producer, discovery of the producer and service authorization are delegated to the SCP) can be supported. In this regard, the action "Consumer sends resource access request to producer with authorization token" may include an SCP, e.g., SCPc relating to the consumer, forwarding an initial Nnrf service request with a newly granted authorization token with resource filters. For example, Model B or C (e.g., where discovery of the producer and service authorization is performed by the consumer) can also be supported.

Further, the consumer (with Model B or C/D) may use a cached authorization token with a needed or wanted resource filter. In this regard, prior to sending an initial (or subsequent) Nnrf service request, the consumer may check whether or not the cached authorization token covers, i.e., is applicable for, the needed or wanted resource filter. If the cached authorization token covers, i.e., is applicable for, the needed or wanted resource filter, the consumer may proceed with this authorization token (i.e., without the need to contact the NRF for a new authorization token). If the cached authorization token does not cover, i.e., is not applicable for, the needed or wanted resource filter, the consumer may behave as illustrated in FIGS. 6 and/or 7, namely by the consumer requesting a new authorization token (for a new or different resource filter or resource filter set), since it does not have cached any authorization token or, at least, not an authorization token applicable for the needed or wanted resource filters.

Next, there are described different exemplary configurations for resource storage or management at a producer.

Figure 8:
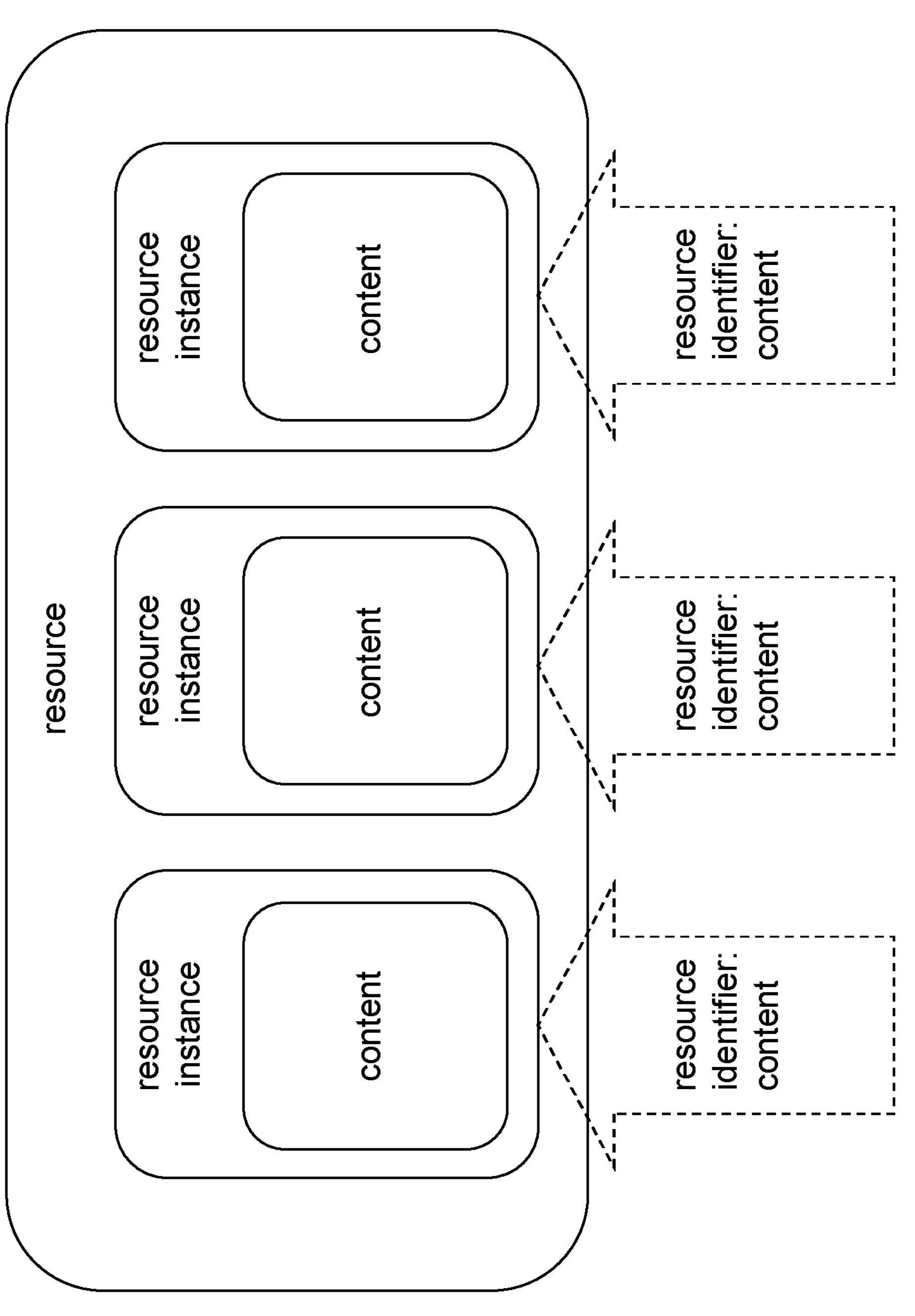
FIG. 8 shows a schematic illustration of a resource managed at/by an apparatus according to at least one example embodiment.

FIG. 8 shows a schematic illustration of a resource managed at/by a producer according to at least one example embodiment. In FIG. 8, a single resource is exemplarily illustrated, while a plurality of resources may be managed in a similar manner.

As shown in FIG. 8, a resource being managed/stored by a producer comprises a plurality of resource instances, each resource instance comprising resource contents (e.g., attributes). For example, the resource may be "subscription data", and the three resource instances may be subscription data of/with resource IDs for IMSI=1, IMSI=2 and IMSI=3. Further, each resource instance is referred to or identified by a resource identifier comprising a specific content, such as URI path and/or query parameters.

When a content-based resource filter is applied, a filtering and/or selection on/for/of the related resource instance may be applied based on such resource management configuration. As an example, when the resource filter defines IMSI=1 for the requested service operation, the producer can filter and/or select the suitable resource instance/s, namely the resource instance/s of/with resource ID for IMSI=1. As another example, when the resource filter defines a unique combination of URI (e.g., path and/or query) parameters referring to or identifying a specific resource instance, the producer can filter and/or select the suitable resource instance/s, namely thus referenced or identified specific resource instance(s).

Figure 9:
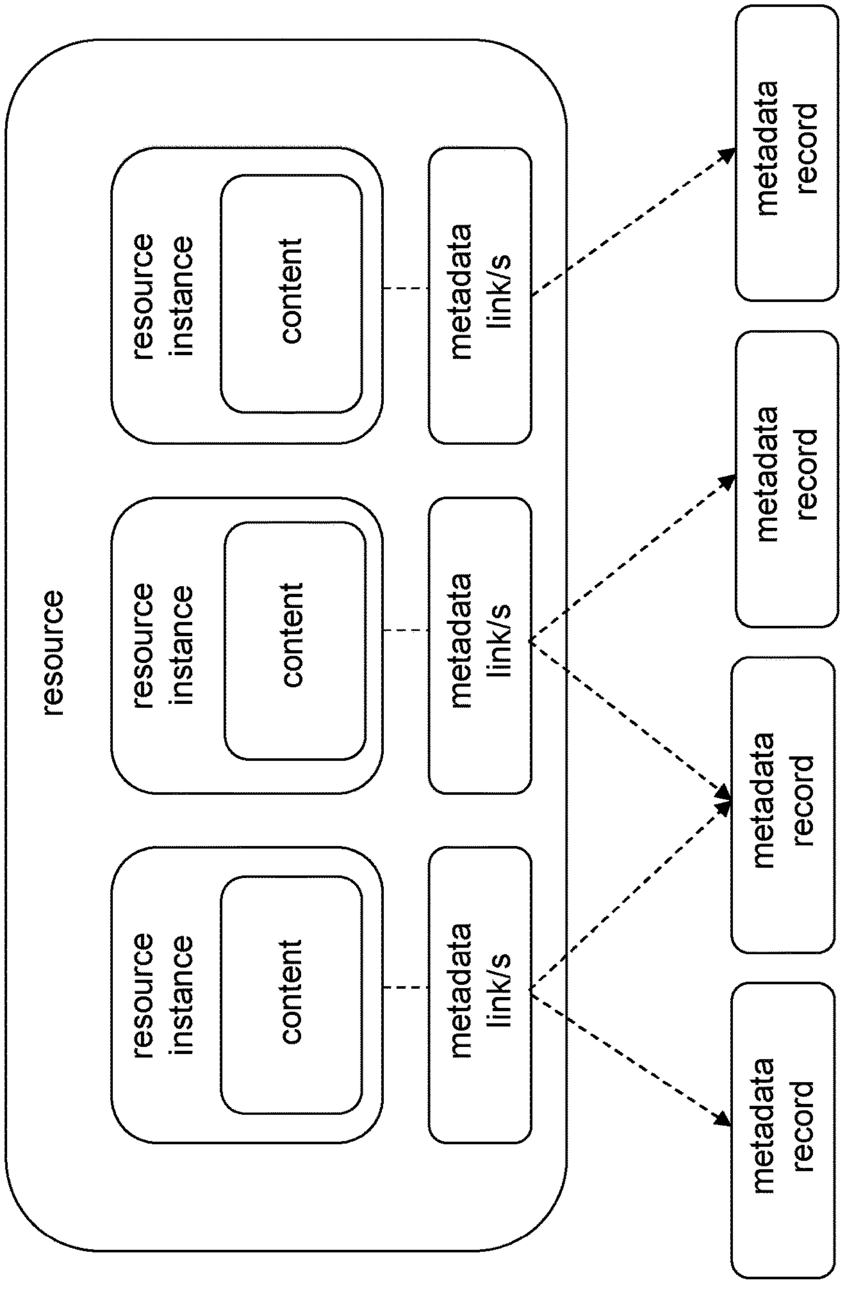
FIG. 9 shows a schematic illustration of a resource managed at/by an apparatus according to at least one example embodiment.

FIG. 9 shows a schematic illustration of a resource managed at/by a producer according to at least one example embodiment. In FIG. 9, a single resource is exemplarily illustrated, while a plurality of resources may be managed in a similar manner.

As shown in FIG. 9, a resource being managed/stored by a producer comprises a plurality of resource instances, each resource instance comprising resource contents (like in the configuration of FIG. 8). Additionally, metadata records (denoted as "metadata") are stored/managed either at by the same apparatus (such as the producer) or another apparatus or entity with which the apparatus (such as the producer) is connected. Storing/managing the metadata at the same producer as the resources to which the metadata relate can improve efficiency of accessing the metadata and, thus, efficiency of the service operation using a metadata-based resource filter.

Further, the apparatus (such as the producer) holds at least one link between each one of the resource instances and one or more metadata records comprising or indicating metadata associated with the respective resource instances. That is, the metadata link/s represent associations between the resource instances and the related metadata, respectively. As is indicated by dashed arrows, a resource instance may be associated with one metadata (record) or plural metadata (records), and a metadata (record) may be associated with one resource instance or plural resource instances.

When a metadata-based resource filter is applied, a filtering and/or selection on/for/of the related resource instance may be applied based on such resource management configuration. For example, when the resource filter defines tenant=MVNO X for the requested service operation, the producer can filter and/or select the suitable resource instance/s, namely the resource instance/s having an associated metadata record for tenant=MVNO X.

The metadata (in the metadata records) can be realized/implemented in any form or structure. For example, the metadata may be an object containing an array of tags, wherein each tag may be any JSON value. In the exemplary metadata object below, the metadata has 3 tags, the first is named “tag1” and has a string value; the second is named “tag2” and has an array-of-strings value; and the third is named “tag3” and has an object/map value, with two members, one a string and the other a number.

```
{
  “tags”: [
    “tag1”: “tag1StringValue”,
    “tag2”: [
      “tag2ArrayElementStringValueA”,
      “tag2ArrayElementStringValueB”
    ],
    “tag3”: {
      “member1”: “abc”,
      “member2”: 123
    }
  ]
}
```

The form or structure of the metadata (and the mechanism for accessing the metadata) can be different or the same for different service operations, resources, or the like. If being the same across all service operations, this allows the concept of metadata-based resource filter to be applied to any (existing or future) SBI and/or API. To allow the metadata to be accessible through an SBI, an API can be defined containing resources representing the metadata (and the mechanism for accessing the metadata). To provide access to metadata for specific resources through SBIs, these SBIs are extended accordingly, i.e., a corresponding general extension to these SBIs may be defined. This will allow consumers to request that the (complete or partial) metadata for the resource being subjected to the requested service operation is returned in a response, and allow producers to return the (complete or partial) metadata for the resource subjected to the requested service operation in the response accordingly.

Next, there is described an exemplary use case of service operations in a system including an NF producer, two NF consumers X and Y and a NRF as a repository. In this regard, resource creation is exemplified as a create operation for creating resource instances (exhibiting a common property) at the NF producer, representing a non-limiting example of (a type of) a service operation which requires authorization of the NF consumer, and resource search is exemplified as a search operation for searching resource instances (exhibiting a common property) at the NF producer, representing a non-limiting example of (a type of) a service operation which does not require authorization of the consumer.

In the description of this exemplary use case, metadata-based resource filters are exemplarily applied/adopted. However, content-based resource filters or a combination of both could equally be applied/adopted.

Figure 10:
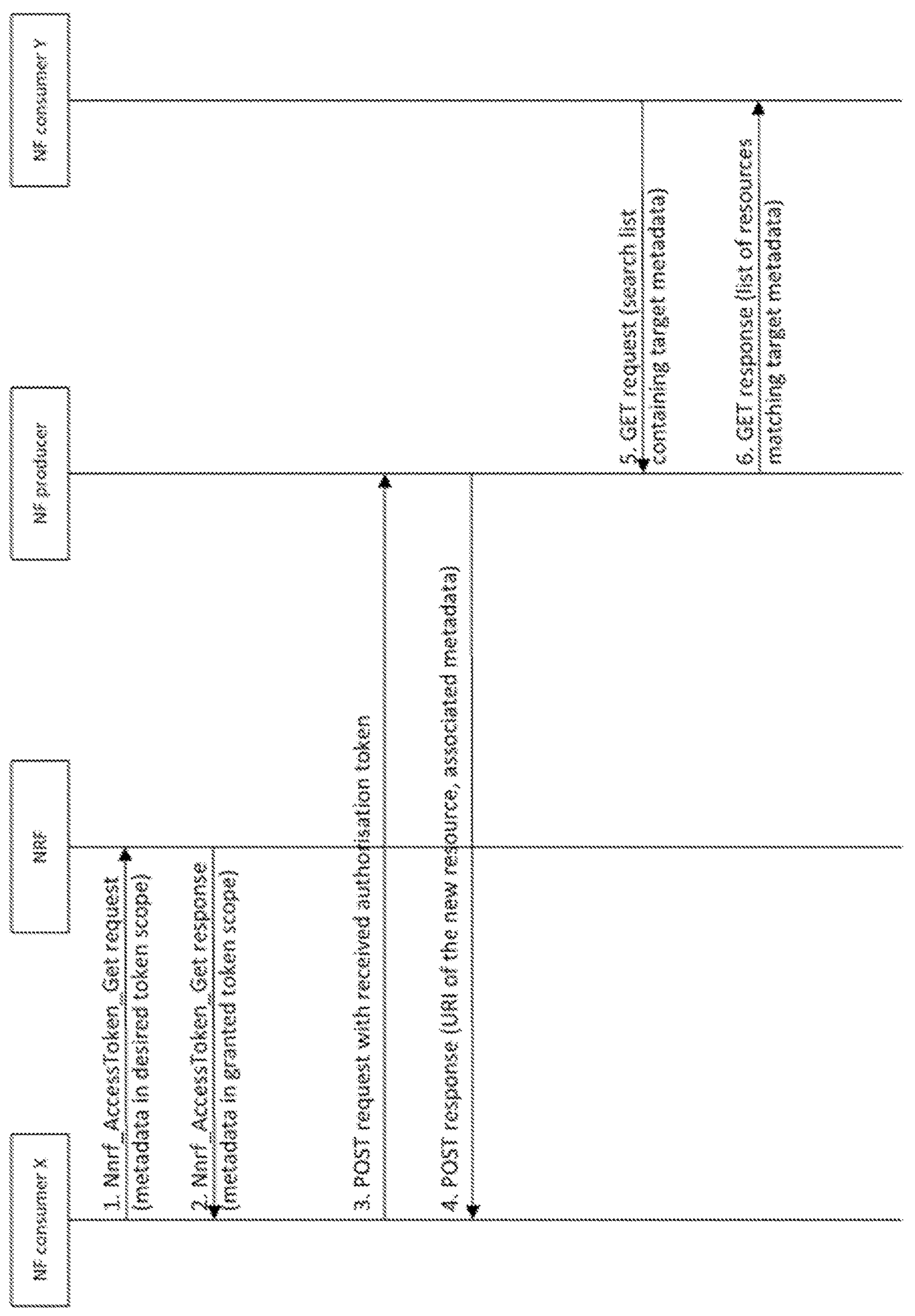
FIG. 10 shows a diagram illustrating an example of a messages or signaling sent between entities of a core network of a mobile communication system according to at least one example embodiment.

FIG. 10 shows a diagram illustrating an example of messages or signaling sent between a first consumer (i.e., NF consumer X), a NRF, a producer, and a second consumer (i.e., NF consumer Y) of a core network of a mobile communication system according to at least one example embodiment. In FIG. 10, actions 1 and 3 are performed by the first consumer (i.e., NF consumer X) and actions 2 and 4 are performed by the NRF and actions 1 to 4 relate to a create operation (which requires or is at least preceded by a related authorization of the first consumer), and actions 5 and 6 are performed by the producer and the second consumer (i.e., NF consumer Y), respectively, and actions 5 and 6 relate to the search operation (which does not require or is at least not preceded by a related authorization of the second NF). A create operation is a service operation to create a new resource.

When performing action 1, the NF consumer X sends an Nnrf_AccessToken_Get request as an authorization request to the NRF in order to obtain an authorization token. In this request, a metadata-based resource filter may be included. That is, metadata for specifying the requested resource or resource instances is included e.g., in the authorization token.

When performing action 2, the NRF, after checking its authorization data/mapping (configuration), sends a Nnrf_AccessToken_Get response as an authorization response to the first consumer (i.e., NF consumer X), which includes an authorization token. In this response, a metadata-based resource filter is included e.g., in the authorization token. That is, metadata for specifying the authorized resource or resource instances is included e.g., in the authorization token (regardless of whether the first consumer (i.e., NF consumer X) has included metadata (as resource filter) in its preceding request).

When performing action 3, the first consumer (i.e., NF consumer X) after verifying that the request is to be accepted (as a result of the corresponding check), sends a resource create request as a service request to the NF producer, e.g., sending a POST with the authorization token received in action 2 (containing metadata in the scope).

When performing action 4, the NF producer sends a POST response in the form of a 200 OK (which indicates that a resource successfully created) as a service response to the NF consumer X. As indicated, such service response may include metadata associated with the newly created resource, in addition to the newly created resource (e.g., an URI thereof). For example, the metadata may be included if being requested by the first consumer (i.e., NF consumer X) in the preceding request when performing action 3.

When performing action 5, the second NF consumer (i.e., NF consumer Y_ (or the first NF consumer (i.e., NF consumer X)) sends a GET request as a search operation request, including query parameters containing a metadata-based resource filter to select resource instances based on such metadata criteria.

When performing action 5, the NRF producer issues a GET response as a search operation response. As indicated, such service response included the (searched) resource/s meet the metadata criteria only. Yet, as mentioned above, the service response may additionally include metadata associated with the searched resource/s, e.g., if being requested by the second consumer (i.e., NF consumer Y) in the preceding request when performing action 5.

It is to be noted that the sequence diagram of FIG. 10 illustrates three subsequent operations by way of example, while these three operations are inherently independent from each other. That is, the create operation may be performed as such (with or without the directly preceding authorization), without being followed by the search operation, and the search operation may be performed for any previously created resource, without requiring the directly preceding create operation.

Next, there is described exemplary use case of resource access in a core network of a mobile communication system including an UDR as producer, two consumers A and B and a NRF as a repository. In this exemplary use case, a multi-tenancy configuration in subscriber data in the UDR is assumed, and this use case can thus be denoted as multi-tenancy access to UDR. More specifically, it is assumed that the UDR manages (i.e. stores/holds) subscription data, i.e. a resource instance, of a subscriber of MVNO X and subscription data, i.e. a resource instance, of a subscriber of MVNO Y, while consumer A serves MVNO X and consumer B serves MVNO Y. Accordingly, the UDR manages (i.e. stores/holds) subscription data of subscribers of multiple MVNOs, and the consumer A assigned to serve subscribers of MVNO X is allowed to access the subscription data of subscribers of MVNO X but not subscription data of subscribers of MVNO Y.

In the description of this exemplary use case, metadata-based resource filters are exemplarily applied/adopted. Thereby, information, e.g., MVNO X and MVNO Y, which is not part of the actual resource or identifier content, can be used as a resource filter so as to provide consumer A assigned to serve MVNO X access to subscription data (i.e., resource instances) managed by a producer of MVNO Y.

For such exemplary use case, the effect of example embodiments (in which a consumer uses resource filters to access resources instances of a resource managed by a producer) is illustrated as compared with a current/conventional mechanism (in which a consumer does not use resource filters to access resource instances of a resource managed by a producer).

Figure 11:
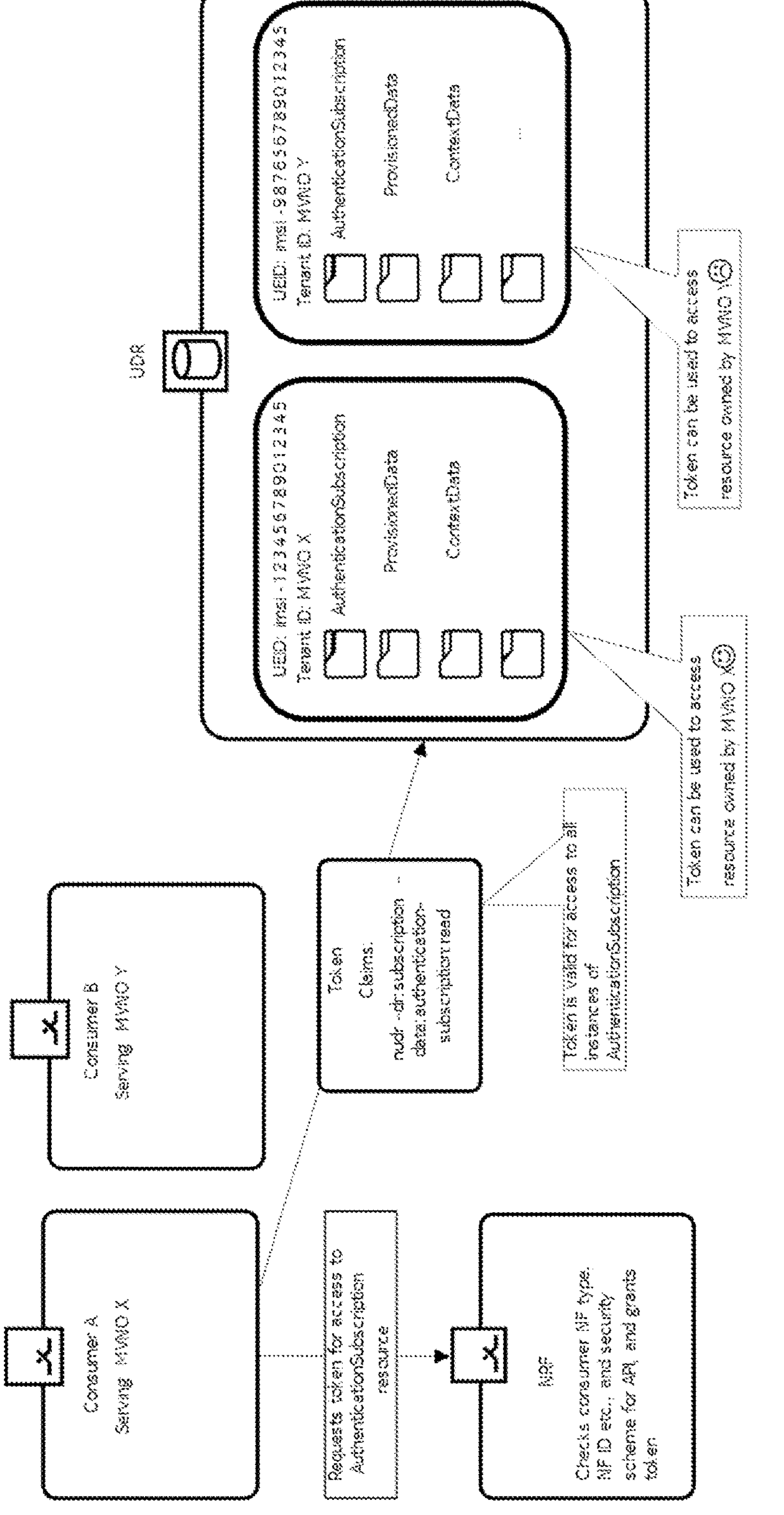
FIG. 11 shows a schematic illustration of an example use case of resource access in a system without resource filtering.

FIG. 11 shows a schematic illustration of an example use case in a mobile communication system where a consumer is provided access to resources managed by a producer without using a resource filter, i.e., adopting a current/conventional mechanism, as a comparative example.

As shown in FIG. 11, the consumer A serving the MVNO X requests a token as an authorization for accessing the subscription data managed by the UDR. Based on the authorization request, the NRF grants a token which allows the consumer A to access all subscription data managed by the UDR, including subscription data owned by both MVNO X and MVNO Y. When using this token, the consumer A is provided access to all subscriber data managed by the UDR, including subscription data owned by both MVNO X and MVNO Y, even though the consumer A should only be provided access to subscription data owned by MVNO the consumer A serves, i.e., subscription data of/for subscribers of MVNO X.

However, with the current/conventional mechanism (in which no resource filters are used) it is not possible to restrict access to group of resources instances, i.e., a subset of a resource, in the above example when subscription data is owned by a single MVNO (at least, if all the subscription data is managed by a common UDR, as is usual).

Figure 12:
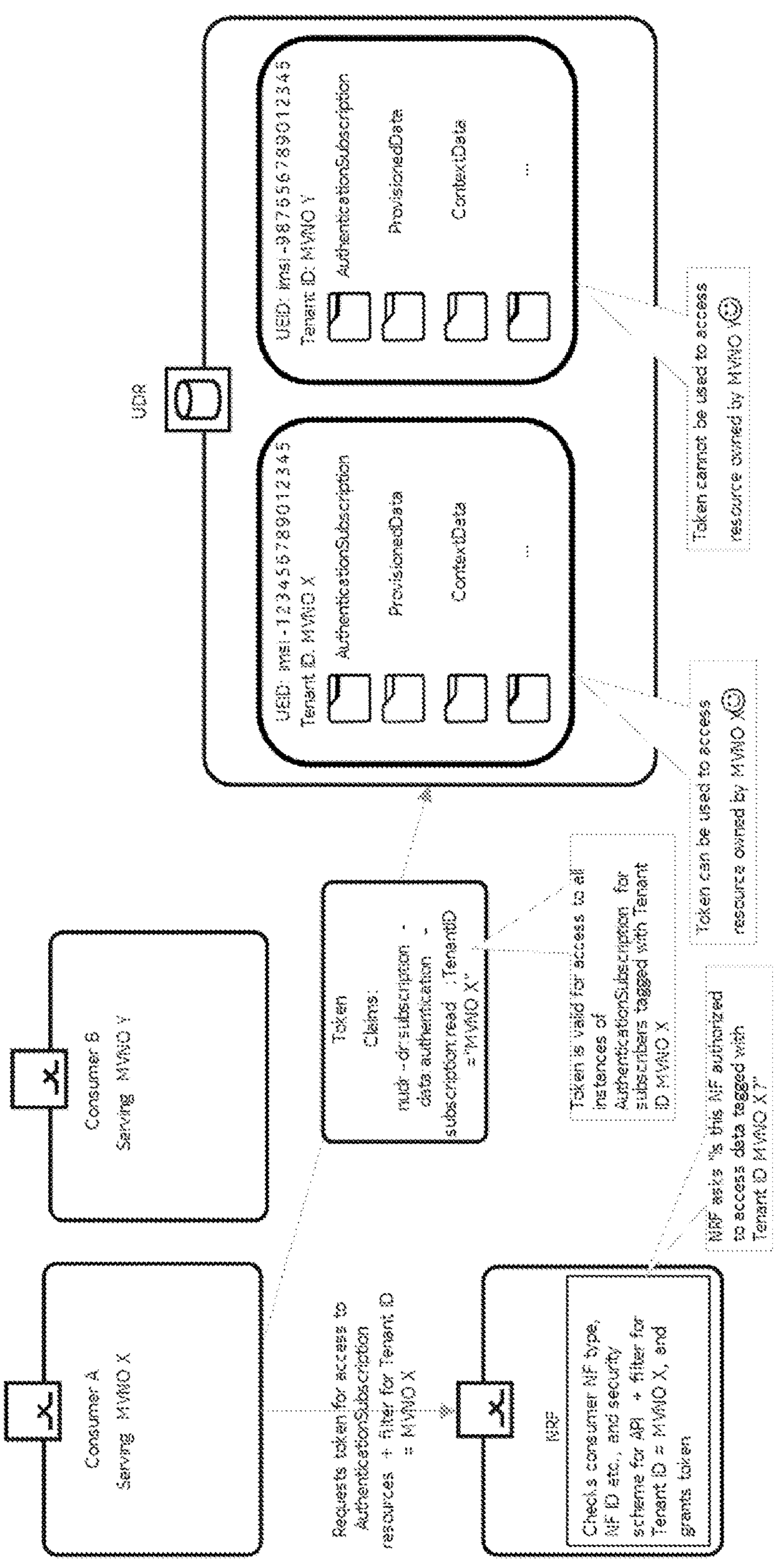
FIG. 12 shows a schematic illustration of an example use case of resource access in a system using resource filtering according to at least one example embodiment.

FIG. 12 shows a schematic illustration of an example use case of resource access in a mobile communication system in which a consumer issues/sends an authorization request including a resource filter (such as that exemplified in FIG. 6).

As shown in FIG. 12, the consumer A serving the MVNO X requests a token as an authorization for accessing the subscription data managed by the UDR, wherein a resource filter is included in the corresponding authorization request. The resource filter specifies a set of subscription data owned by MVNO X. Based on the authorization request, the NRF generates and grants a token (including a corresponding resource filter) which allows the consumer A to access corresponding (requested) subscription data managed by the UDR, including a set of subscription data owned by MVNO X but not including subscription data owned by MVNO Y (or other tenants). When using this token, the consumer A is provided access to corresponding (requested) subscription data managed by the UDR, namely subscription data owned by MVNO X only, as is desired or appropriate.

Hence, with this mechanism it is possible to restrict access to segments of a resource or group of resource instances, i.e., a subset of a resource, in the above example subscription data owned by a single MNVO (even if the data for all resource groups are managed by a common UDR, as is usual).

Figure 13:
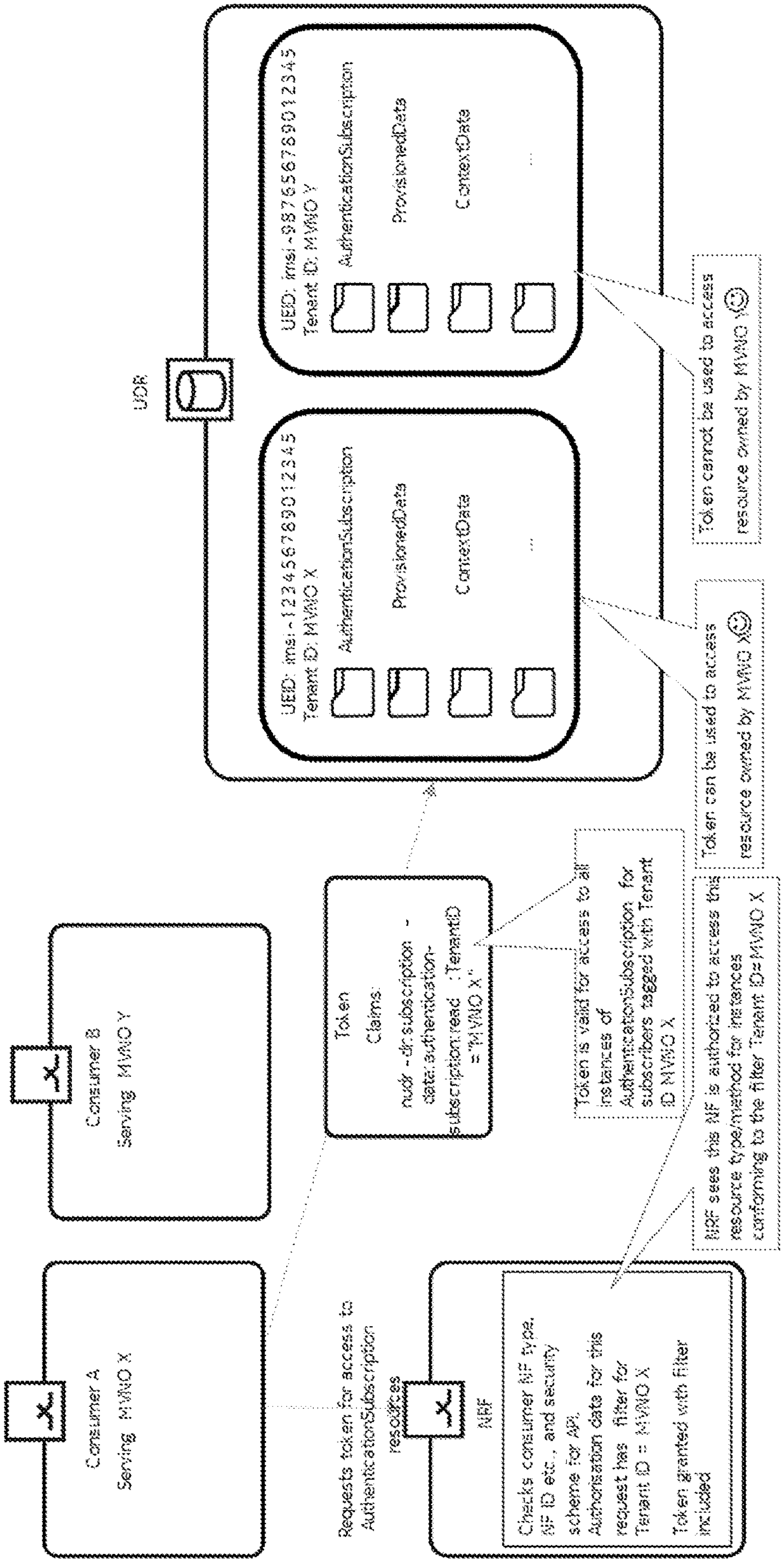
FIG. 13 shows a schematic illustration of an example use case of resource access in a mobile communication system using resource filtering according to at least one example embodiment.

FIG. 13 shows a schematic illustration of an example use case of resource access in a mobile communication system using resource filtering according to at least one example embodiment in which the consumer issues/sends an authorization request that does not include a resource filter (such as that exemplified in FIG. 7).

As shown in FIG. 13, the consumer A serving the MVNO X requests a token as an authorization for accessing the subscription data managed by the UDR. Based on the authorization request, the NRF checks its authorization data/mapping (configuration), and identifies that the requesting consumer A is allowed/authorized to only access subscription data owned by its served MVNO, i.e. subscription data of/for subscribers of MVNO X. Accordingly, the NRF generates and grants a token (including a corresponding resource filter) which allows the consumer A to access corresponding (allowed/authorized) subscription data managed by the UDR, including subscription data owned by MVNO X but not including subscription data owned by MVNO Y (or other MNVOs). Namely, the thus included resource filter specifies the allowed/authorized set of subscription data of MVNO X. When using this token, the consumer A is provided access to corresponding (requested) subscription data managed by the UDR, namely subscription data owned by MVNO X only, as is desired or appropriate.

Hence, with this mechanism it is possible to restrict access to subscription data (i.e., resource instances) of a subset of subscribers in the above example subscription data owned by a single MNVO (even if the subscription data for all subscribers are managed by a common UDR, as is usual).

Next, some further exemplary use cases of example embodiments are described as non-limiting examples for illustrative purposes.

As an exemplary use case, a case of multi-tenancy (of subscriber data, or the like) in HSS can be considered. This case is similar to the case of multi-tenancy (of subscriber data, or the like) in UDR.

As an exemplary use case, a case of multi-tenancy (of subscriber data, or the like) in the context of UDM access to UDR can be considered. This case is similar to the case of multi-tenancy (of subscriber data, or the like) in UDR in the context of a consumer access.

Figure 14:
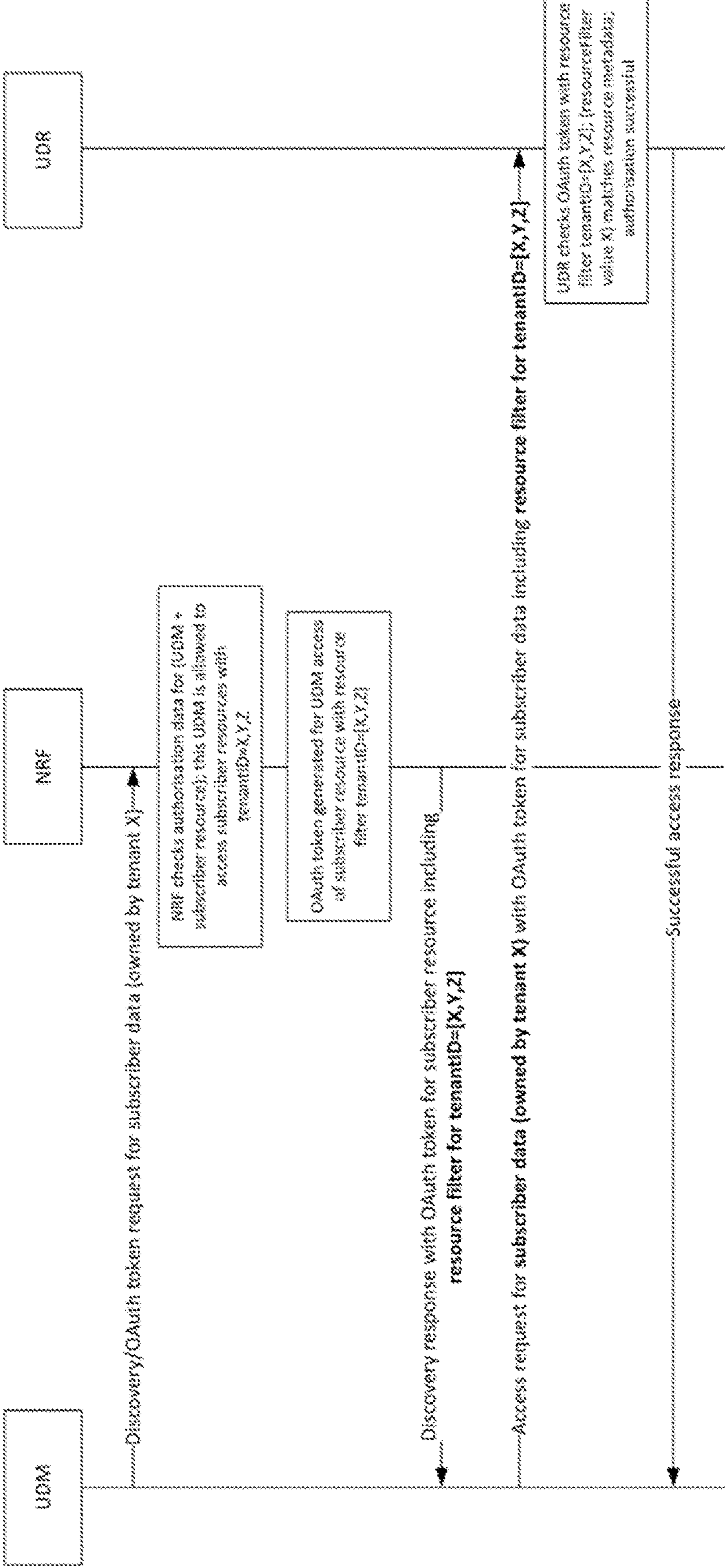
FIG. 14 shows a diagram illustrating an example of a procedure according to at least one example embodiment.

FIG. 14 shows a diagram illustrating an example of a procedure of an exemplary use case according to at least one example embodiment. In the example of FIG. 14, UDM acts as consumer, NRF acts as repository, and UDR acts as producer.

As an exemplary use case, a case of the UDM requesting an authorization token and requesting resource access is shown. Before sending a "Discovery/OAuth token request", it may be known in the UDM, e.g. by registration, configuration, etc., that the UDM needs or wants to access subscription data owned by tenant X, and when NRF grants an authorization token with a resource filter for "tenantID=[X, Y,Z]" the current access request to the UDR is handled as indicated in FIG. 14. Although not shown in FIG. 14, the UDM may cache the OAuth token received by the NRF, e.g., for its validity time. Then, if the UDM needs or wants to apply an additional access request for subscription data owned by tenant Y, the cached OAuth token, which is applicable for or comprises a resource filter for "tenantID=[X,Y,Z]", is valid/applicable and can be used. Thereby, the UDM can request access to subscriber data owned by tenant Y, even if the UDM did not explicitly request (an OAuth token for) such resource filter.

Figure 15:
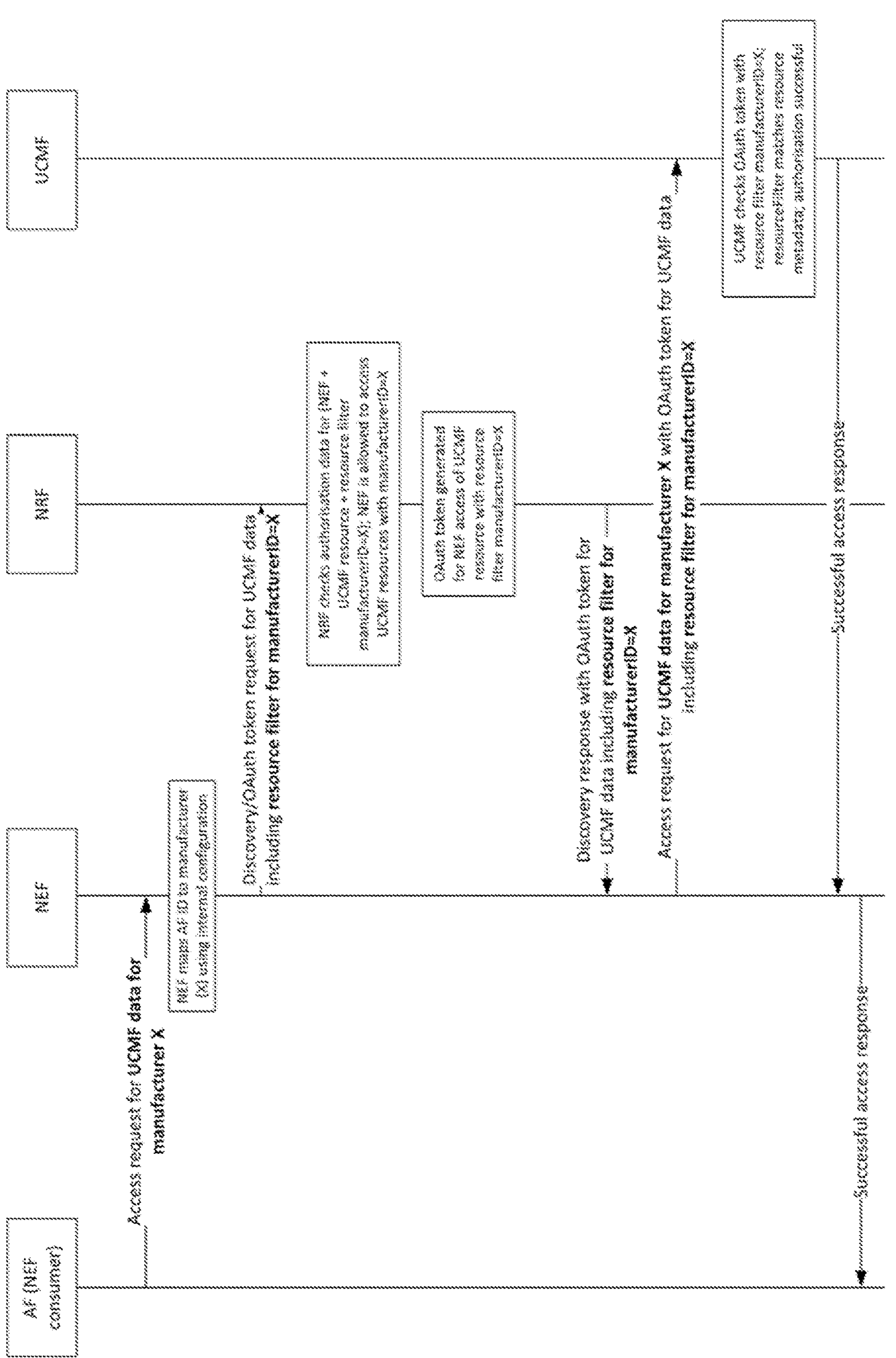
FIG. 15 shows a diagram illustrating an example of a procedure according to at least one example embodiment.

FIG. 15 shows a diagram illustrating an example of a procedure of an exemplary use case (assuming involvement of NEF) according to at least one example embodiment. In the example of FIG. 15. AF acts as consumer (in particular, NEF consumer), NEF acts as intermediary, NRF acts as repository, and UCMF acts as producer.

As an exemplary use case, a case of provisioning of manufacturer-assigned UE radio capability IDs directly by UCMF or via NEF can be considered. In this case, UCMF may store and manage UE radio capability records (of UEs) which are assigned by an operator of a mobile communication network or by the UE manufacturers. If assigned by the UE manufacturer, a write access to UE radio capability records in UCMF owned by UE manufacturer X is to be restricted to those consumers which are authorized to modify UE radio capability records for UE manufacturer X. In this regard, an AF acting as a consumer can be authorized to access UE radio capability records managed by UCMF and owned by a specific UE manufacturer using a resource filter e.g., containing manufacturer ID, UE type code or a similar identifier.

Figure 16:
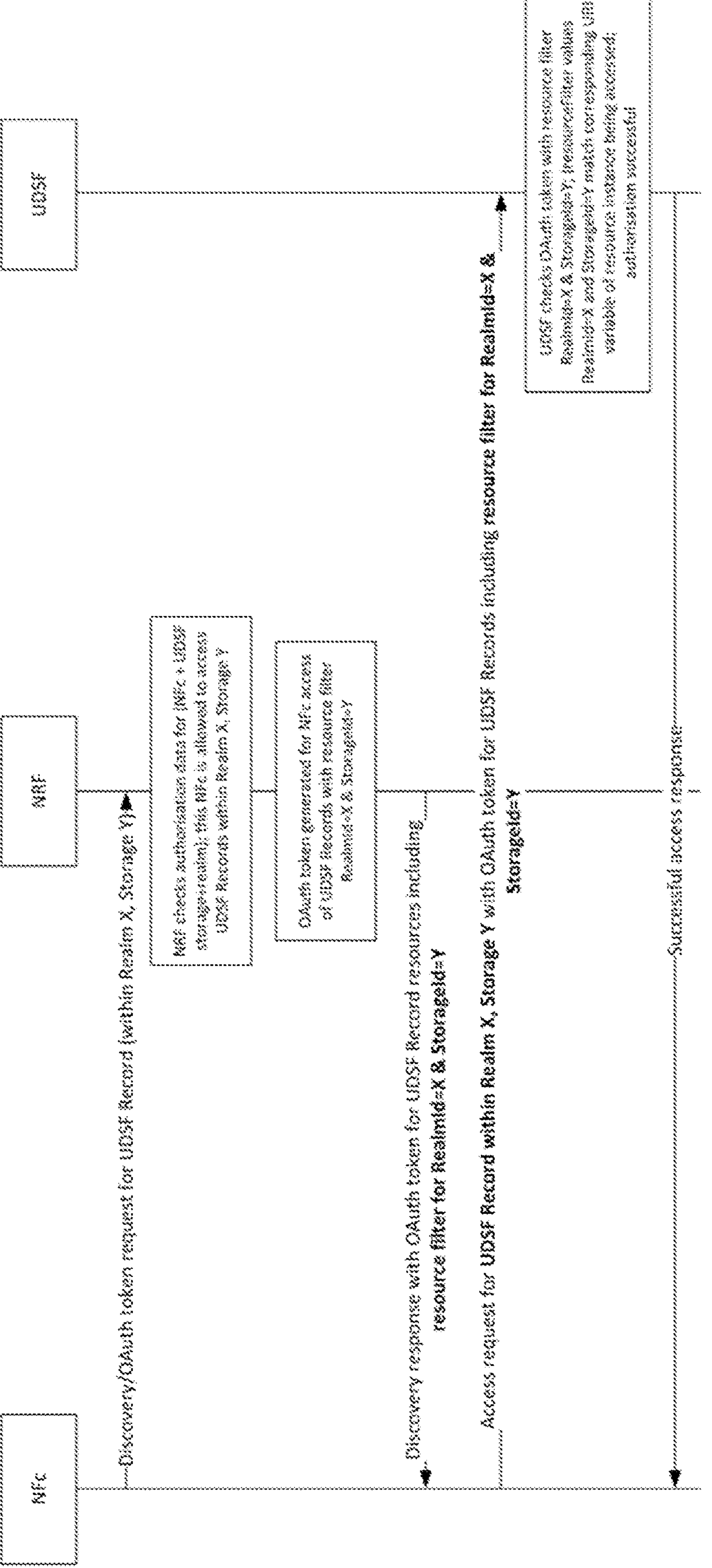
FIG. 16 shows a sequence diagram illustrating an example of a procedure according to at least one example embodiment.

FIG. 16 shows a diagram illustrating an example of a procedure according to at least one example embodiment. In the example of FIG. 16, NFc is as consumer, NRF is as repository, and UDSF is as producer.

As an exemplary use case, consumer (NFc) access to UDSF realm and storage IDs assigned for specific purposes can be considered. In this case, UDSF may manage records for multiple different purposes, each used by different applications, wherein the records may be segmented into realms (having realm IDs) and each realm may be further segmented into storages (having storage IDs). A consumer may be configured to use specific realms and/or storages, and it may be required to only allow a consumer access to the records within those realms and storages. In this regard, a consumer (UDSF consumer) can be authorized to access resources in UDSF within a restricted set of realms/storages using a resource filters e.g. containing realm ID(s) and/or storage ID(s).

In the following, various example embodiments are outlined by way of example, taking into account (but not being limited to) the above example use cases.

According to various example embodiments, an authorization data/mapping (configuration) at a NRF may be extended to allow optional inclusion of resource filters. In this regard, it is to be noted that a NRF stores mappings between consumer instances and related services/resources/methods/etc. which the consumers are authorized to access, use, apply, or the like. Depending on the implementation, the consumer instance part of a mapping may take the form of specific NF instances, NF types, 'patterns' identifying groups of NF instances, or the like. Similarly, the service/resource/method/etc. part a mapping may include specific service/resource/method/etc. combinations or 'patterns' identifying groups of resource types or the like. For example, the resource part of a mapping can be extended to allow inclusion of resource filters, such as specific sets, ranges or patterns (all of which may include wildcards) that define (a common property of and thus) a number or group of resource instances that a network function acting as a consumer is authorized to access, generate, delete, search, or the like.

According to various example embodiments, an authorization token (such as e.g., an OAuth token), i.e., its (security) claim/s, may be extended to allow optional inclusion of resource filters. In this regard, authorization tokens (such as e.g., OAuth tokens) include one or more (security) claims that specify for which services/resources/methods/etc. the token may be used to authorize access, usage, application, or the like. Such (security) claim/s may be extended to allow specification of a set of resource instances. This may be accomplished by using resource filters, i.e., inclusion of resource filters, such as specific sets, ranges or patterns (all of which may include wildcards) that define (a common property of and thus) a number or group of resource instances that a network function acting as a consumer is authorized to access, generate, delete, search, or the like. For example, resource filters may be based on a resource URI variable, an attribute within the resource, or any other approach of specifying a (sub-)set of resource instances. Such (security) claim/s may be set during token generation and/or may be based on an authorization request received from a consumer or the authorization data/mapping (configuration) for the consumer stored in the NRF or a combination of both.

According to various example embodiments, an NF consumer may optionally be configured to request a service operation for specific resources or resource instances using resource filters. Further, an NF consumer may optionally be configured to request authorization for specific resources or resource instances using resource filters. For example, NF consumers may request an authorization token (such as e.g., an OAuth token) based on the service/resource/method/etc. they intend to access or the like. For model D (i.e., delegated discovery with SCP), the resource filters may be passed in discovery headers, i.e., the consumer may provide the resource filters in HTTP headers and the SCP may perform a token request using the received filter information. For other models, the resource filters may be passed in an authorization (token) request. If a service that the consumer is accessing has been configured to have restricted access based on resource filters, the consumer may request an authorization token using an appropriate resource filter, or may specify the resource instance/s (and approach/es) that it intends to access or the like. The consumer may be configured to make it aware (to the NRF) that the resources or resource instances that it may access or the like are configured to have access control using resource filter (i.e. have restricted access) or, stated in other words, have resource instance/segment access control applied at the producer.

According to various example embodiments, a producer may have a behavior which is configured to define or control whether or not to authorize a service operation, such as access, creation, deletion, search or the like, of managed/stored resources using resource filters if present in a received service operation, particularly an authorization token (such as e.g., OAuth token) therein, or configured locally. A NF producer receiving a service request such as a resource access request for a resource or resource instance that has restricted access may check that the resource or resource instance being accessed matches any resource filter in the (security) claim/s in the received service operation, particularly the authorization token (such as e.g., OAuth token) therein. Such behavior can be configured locally or predefined/standardized e.g., per resource. Additionally, even if the resource or resource instance being subjected to the service operation, e.g. to be accessed, is not configured at the producer to have restricted access based on resource filters, the NF producer receiving a service request such as a resource access request with a (security) claim in an authorization token (such as e.g. an OAuth token) containing a resource filter may check that the resource or resource instance being subjected to the service operation, e.g. to be accessed, matches any filter in the (security) claims in the authorization token (such as e.g. the OAuth token). Thereby, the invocation of the producer behavior of checking the resource or resource instance subjected to the service operation against any resource filter information applicable to the consumer may be effectively delegated to the NRF.

According to various example embodiments, various (kinds, types or forms of) resource filters may be adopted/applied or used to access resources managed by a producer. For example, content-based resource filters, i.e., resource filters being based on and/or comprising content of resource instances or resource identifiers of resource instances, or metadata-based resource filters, i.e., resource filters being based on and/or comprising metadata associated with resource instances, are conceivable. For example, specification/identification of a set of resource instances for a service operation, such as access authorization or other purposes, can be achieved by resource-related content of the resources in a requested resource set, such as a URI variable or an attribute, which are stored (as part of the content) in the resource or a resource identifier thereof, a content-based resource filter can be used. For example, specification/identification of a set of resource instances for a service operation, such as access authorization or other purposes, cannot be achieved by resource-related content of the resources in a requested resource set, e.g., by neither a URI variable nor an attribute, a metadata-based resource filter can be used. As explained above, an example of the latter case is a multi-tenancy use case, in which e.g., subscriber subscription data (i.e., resource instances) may be owned by different tenants, whereas there is no concept of a tenant or owner of the subscription data in the definitions (contents) of the resources or their identifiers.

Hence, metadata-based resource filter can be generally applied to, or associated with, any resources without the need to modify or extend the resource definitions (contents) in corresponding SPI specifications. Metadata can then be used in resource filters (and other cases), allowing more flexible specification of sets of resource instances, without API modification being required. Another advantage of the use of metadata associated with resources over resource content stored in resources is that the metadata values do not need to be stored for each instance of the resource but they can be shared or specified in configuration data. Namely, it is sufficient that any resource managed by a producer has a metadata assigned to or associated with it. Such metadata can take any form, and/or can be stored anywhere (as long as accessible to the producer), and/or does not have to be stored multiple times (i.e., once for each instance of the resource), and/or does not need to be standardized. To this end, multiple resources can be assigned to or associated with a single characteristic, more specifically a characteristic that is not standardized, i.e., specific to a network operator or the like, or contained in resource contents, i.e., does not directly map onto any division of storage such as e.g., a UDR instance. By allowing e.g. an operator of a communication network comprising the UDR to associate any resources with any metadata, several flexible data management and access concepts are enabled/facilitated, including e.g. the ability to search for (all) resources that have a specific metadata tag and value, e.g. all resources owned by tenant X, the ability to authorize any service operation, e.g. access, to resource instances that have a specific metadata tag and value, e.g. all resources owned by tenant X. Metadata may comprise or be defined by one or more tags and a corresponding value of each tag.

According to various example embodiments, a producer is allowed or configured to associate metadata of any content with any resource(s) managed by a producer (at which a service operation requested by the consumer is performed on the resource(s)), and the producer is allowed or configured to optionally store/manage a link (or reference) between a resource instance and some metadata that is associated with that resource instance. For authorization, an authorization token (such as e.g., an OAuth token) generated by a repository such as NRF may include metadata as part of (the scope of) the authorization data/mapping (configuration). For example, a consumer initiating a search operation or some other service operation, e.g., with URI query parameters, may include query parameters containing metadata-based resource filters to select resource instances based on correspondingly defined metadata criteria. For example, a consumer sending a service request to access (e.g., read, create, update/modify or delete) a resource (or resources) may request that the (complete or partial) metadata for the resource (or resources) subjected to the service operation is returned in a service response or some other related response. A producer responding to a service request from a consumer that includes a request to be given the metadata for a resource (or resources) subjected to the service operation may provide (send) complete or partial metadata applicable to that resource (or resources) based on the consumer's request.

According to various example embodiments, a producer may manage/store one or more 'links' (or references) between any resource instance that the producer serves and an item of metadata. Hence, resources can share metadata, avoiding the need to store the same metadata items multiple times, thus reducing the required storage space. The metadata can be accessed and/or managed or manipulated (e.g., created, read, updated, deleted) using a service-based interface (SBI), while it is optional but not required that the metadata as such is accessible to consumers over an SBI (either a specific SBI or the one providing access to the resources related to the metadata).

For example, metadata can be accessed when the producer processes a service request received from a consumer to access a resource. This can happen in several cases, including, but not limited to checking metadata for access control and searching. In the former example case, i.e. checking metadata for access control, an authorization token received from the consumer contains one or more resource filters that are based on metadata, the resource is first accessed by the producer, and then the link to the metadata is followed to access the resource's metadata to check that the resource's metadata matches the metadata-based resource filter/s received in the authorization token, i.e. check that the resource is within the resource instance set specified by the resource filters in the authorization token. In the latter example case, i.e. searching, the metadata tags for each resource in the scope of the search operation are checked against those provided in the search parameters, while optionally the producer can optimize the search using an index (as for searches on other resource attributes), or the metadata can have a list of reverse links, so only the metadata needs to be searched, not every resource in the scope of the search operation.

According to various example embodiments, metadata (such as metadata items), e.g., in the form of metadata-based resource filters, can be applied, included or transported in service requests/responses, authorization requests/responses, or the like. For example, metadata (such as metadata items) can be applied, included or transported in search requests, e.g., as query parameters in an HTTP GET method, (bulk) delete requests, e.g., as query parameters in an HTTP DELETE method, resource filters in authorization (e.g., OAuth) tokens and requests for authorization (e.g., OAuth) tokens, responses to any resource access request or other service request.

According to various example embodiments, one or more of an authorization (e.g., OAuth) token may include (in/as its claims) one or more resource filters based on metadata (tag(s) and value(s)). In case of a search operation or a (bulk) delete operation in an API extended to allow query parameters (i.e., resource filters) of metadata type, a producer can perform the search operation or the (bulk) delete operation with metadata-type query parameters by matching parameters to resource metadata. In case of a resource access operation in an API extended to allow query parameters (i.e., resource filters) of metadata type, a producer can authorize access to resources using resource filters of metadata type if present in the received authorization (e.g., OAuth) token.

According to various example embodiments, in the context of authorization, a consumer may send a request for a resource to a producer with an authorization (e.g., OAuth) token containing a resource filter of metadata type. Then, the producer may check the requested resource's metadata against resource filters in (security) claim/s of/in the authorization (e.g., OAuth) token to see if access should be allowed. The request is processed as normal if access is allowed, or rejected if not.

According to various example embodiments, e.g., in the context of searching (or any other service operation for resource access), a consumer may send a search (or corresponding service) request with query parameters containing content-based resource filters and/or metadata-based resource filters. Then, a producer may match content-based resource filters in query parameters to resource content or resource identifier content, and/or may match metadata-based resource filters in query parameters to resource metadata.

According to various example embodiments, metadata relating to a resource (instance) subjected to a service operation may be provided from a producer to a consumer upon a corresponding request by the consumer. In this regard, the consumer may send a service request for a specific resource and include therein (or send in a related message) an indicator (i.e., a request) that the producer should send in the response complete or partial metadata for the resource (instance) subjected to the service operation. The indicator may either request all metadata for the resource (instance) or may list specific items of metadata that are requested. The indicator may for example be transported in an HTTP header. Then, the producer may send a response to the request (e.g., in the related service response) that may include full or partial metadata for the resource (instance) subjected to the service operation based on the consumer's indication (or request). The returned metadata for the resource (instance) may for example be transported in an HTTP header.

By virtue of example embodiments, as evident from the above, there are provided measures/mechanisms for (enabling/realizing) network operability on a resource instance level (i.e., for a given service operation or authorization the level of a segment, portion or part of a resource) in (a core network of) a mobile communication system.

Various example embodiments provide a technique for allowing specification of resource instances or, stated in other words, definition of a resource filter. Accordingly, (security) claims/scopes of authorization tokens and/or (security) schemes/mechanisms adopted/applied in the context of service operations between initiator and responder entities can be extended, particularly by allowing/using a resource filter.

Various example embodiments may use various (kinds, types or forms of) resource filters, such as content-based resource filters, i.e., resource filters being based on and/or comprising content of resource instances or a resource identifier referring to resource instances, or metadata-based resource filters, i.e., resource filters being based on and/or comprising metadata associated with resource instances. Using content-based resource filters is (more) effective/beneficial as long as the content of the subject resources or their resource identifier (as defined by a related API) are sufficient for specifying (a common property or characteristic of) a requested set of resource instances to be subjected to a desired service operation or authorization. Otherwise, using metadata-based resource filters is (more) effective/beneficial. In this case, a service operation or authorization can use a flexible and extensible set of metadata (managed by an operator) rather than being limited to the exact content of the resources or their resource identifier (as defined by a related API), and an improved service operation and/or an improved authorization of a service operation can be enabled by allowing a set of resource instances to be specified using metadata-type filters rather than just resource content or resource identifier filters.

The above-described functionality as well as its related operations, procedures, methods and processes may be implemented by respective functional elements, entities, modules, units, processors, or the like, as described below. These functional elements, entities, modules, units, processors, or the like, i.e., the implementation of one or more example embodiments, may be realized in an apparatus.

While in the foregoing example embodiments are described mainly with reference to operations, procedures, methods and processes, corresponding example embodiments also cover respective apparatuses, entities, modules, units, network nodes and/or systems, including software and/or hardware thereof.

Respective example embodiments of the present invention are described below referring to FIGS. 17 and 18, while for the sake of brevity reference is made to the detailed description of respective corresponding configurations/setups, schemes, processes, sequences, methods as well as functionalities, principles and operations according to FIGS. 1 to 16.

Figure 17:
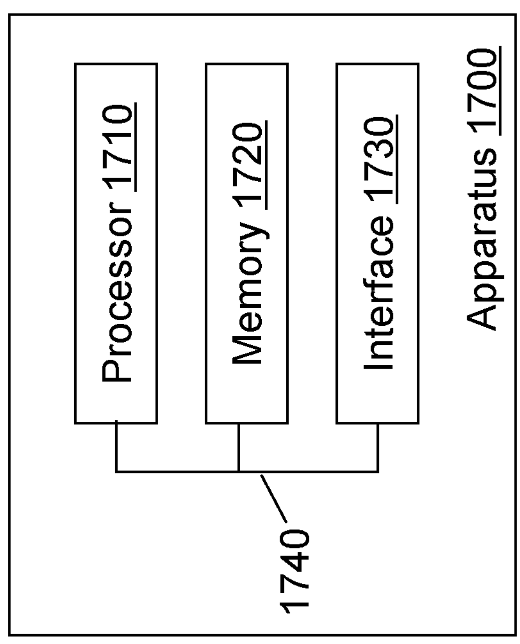
FIG. 17 shows a schematic block diagram illustrating an example of a structure of apparatuses according to at least one example embodiment.
Figure 18:
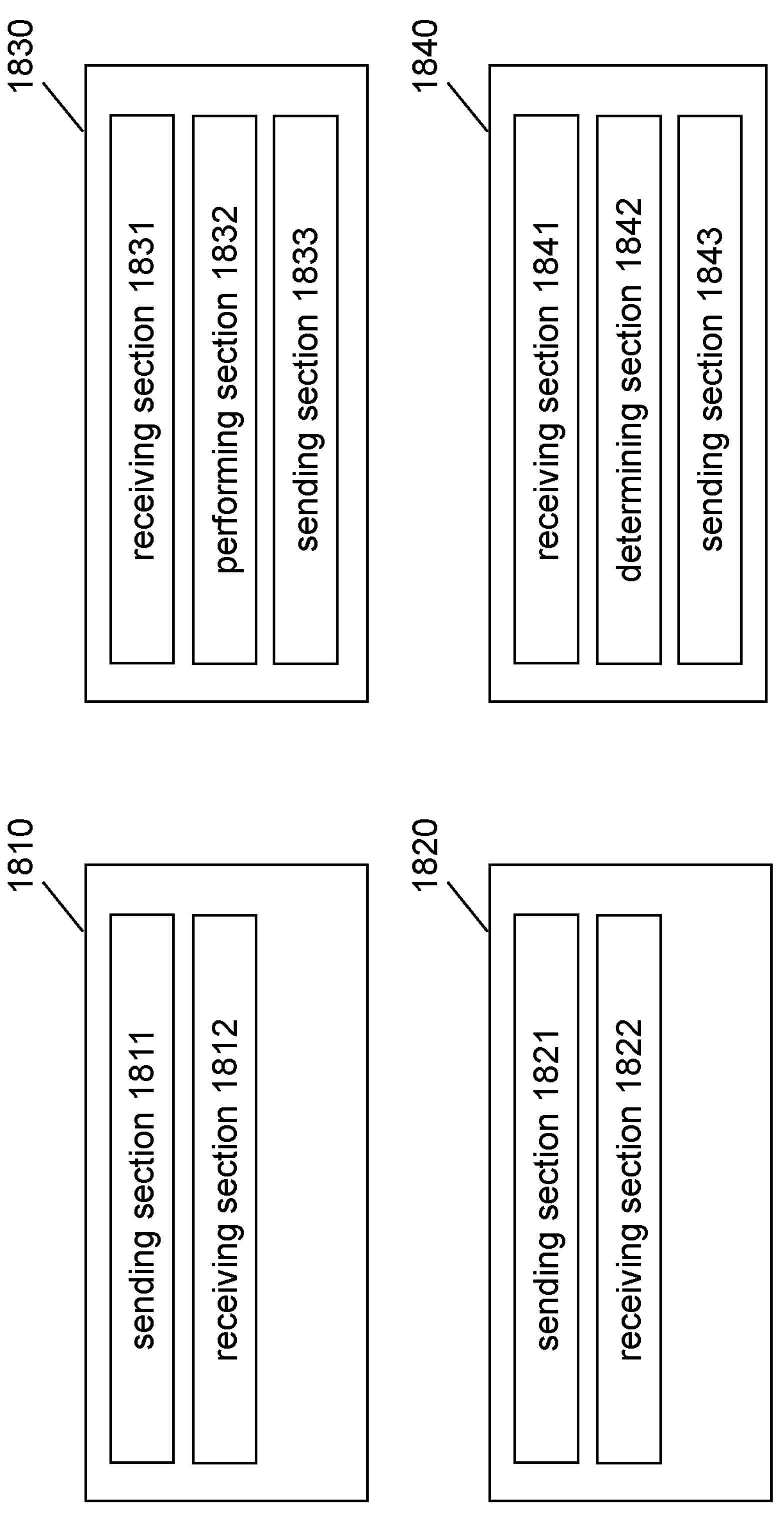
FIG. 18 shows a schematic block diagram illustrating an example of a structure of apparatuses according to at least one example embodiment.

In FIGS. 17 and 18, the blocks are basically configured to perform respective methods, procedures and/or functions as described above. The entirety of blocks are basically configured to perform the methods, procedures and/or functions as described above, respectively. With respect to FIGS. 17 and 18, it is to be noted that the individual blocks are meant to illustrate respective functional blocks implementing a respective function, process or procedure, respectively. Such functional blocks are implementation-independent, i.e., may be implemented by means of any kind of hardware or software or combination thereof, respectively.

Further, in FIGS. 17 and 18, only those functional blocks are illustrated, which relate to any one of the above-described methods, procedures and/or functions. A skilled person will acknowledge the presence of any other conventional functional blocks required for an operation of respective structural arrangements, such as e.g., a power supply, a central processing unit, respective memories or the like. Among others, one or more memories are provided for storing programs or program instructions for controlling or enabling the individual functional entities or any combination thereof to operate as described herein in relation to example embodiments.

FIG. 17 shows a schematic diagram illustrating an example of a structure of apparatus according to at least one example embodiment. Herein, an apparatus can represent a physical entity or component, e.g., a device implementing a specific network element, entity or function of a core network of a mobile communication system or the functionality of a specific network element, entity or function, or a functional or logical entity or component. For example, the illustrated apparatus may be realized in or by a computing device, such as a server, a distribute computing system, or a cloud computing system.

As indicated in FIG. 17, according to at least one example embodiment, an apparatus 1700 may comprise or realize at least one processor 1710 and at least one memory 1720 (and possibly also at least one interface 1730), which may be operationally connected or coupled, for example by a bus 1740 or the like, respectively.

The processor 1710 and/or the interface 1730 of the apparatus 1700 may also include a modem or the like to facilitate communication over a (hardwire or wireless) link, respectively. The interface 1730 of the apparatus 1700 may include a transmitter, receiver or transceiver connected or coupled to one or more antennas, antenna units, such as antenna arrays or communication facilities or means for (hardwire or wireless) communications with the linked, coupled or connected device(s), respectively. The interface 1730 of the apparatus 1700 is generally configured to communicate with at least one other apparatus, device, node or entity (in particular, the interface thereof).

The memory 1720 of the apparatus 1700 may represent a (non-transitory/tangible) storage medium (e.g. RAM, ROM, EPROM, EEPROM, etc.) and store respective software, programs, program products, macros or applets, etc. or parts of them, which may be assumed to comprise program instructions or computer program code that, when executed by the respective processor, enables the respective electronic device or apparatus to operate in accordance with example embodiments described herein. Further, the memory 1720 of the apparatus 1700 may (comprise a database to) store any data, information, or the like, which is used in the operation of the apparatus.

According to various example embodiments, respective apparatuses (and/or parts thereof) may represent means for performing respective operations and/or exhibiting respective functionalities, and/or the respective devices (and/or parts thereof) may have functions for performing respective operations and/or exhibiting respective functionalities.

In view of the above, the illustrated apparatus 1700 can be used in practicing one or more of the example embodiments, as described herein.

When in the subsequent description it is stated that the processor (or some other means) is configured to perform some function, this is to be construed to be equivalent or corresponding to a description stating that a (i.e. at least one) processor or corresponding circuitry, potentially in cooperation with a computer program code stored in the memory of the respective apparatus or otherwise available (it should be appreciated that the memory may also be an external memory or provided/realized by a cloud service or the like), is configured to cause the apparatus to perform at least the thus mentioned function. It should be appreciated that herein processors, or more generally processing portions, should not be only considered to represent physical portions of one or more processors, but may also be considered as a logical division of the referred processing tasks performed by one or more processors.

According to at least one example embodiment, the illustrated apparatus 1700 may represent or realize/embody a (part of a) initiator entity, or an element, function or entity of similar/comparable functionality or operability, in/of a network, e.g., a (core) network of a mobile communication system. Such initiator entity may for example be or relate to a (NF service) consumer or an intermediary entity between a (NF service) consumer and a (NF service) producer. Hence, the apparatus 1700 may be configured to perform a procedure and/or exhibit a functionality and/or implement a mechanism, as described (for an initiator entity or an intermediary entity or a consumer) in any one of FIGS. 1 and 5 to 16.

Accordingly, the apparatus 1700 may be caused or the apparatus 1700 or its at least one processor 1710 (possibly together with computer program code stored in its at least one memory 1720) may be configured to send a service request for a service operation on a specific resource managed by a responder entity of the network, said service request comprising at least one resource filter specifying a set of resource instances of the specific resource that the service operation is to be performed on, and to receive a service response to the service request from the responder entity, said service response comprising a result of performing the service operation on the set of resource instances specified by the at least one resource filter.

Further, the apparatus 1700 may be caused or the apparatus 1700 or its at least one processor 1710 (possibly together with computer program code stored in its at least one memory 1720) may be configured to send an authorization request for authorization for the initiator entity to request a service operation on the specific resource to a repository entity of the network, and/or to receive an authorization response to the authorization request for authorization for the initiator entity to request a service operation on the specific resource from the repository entity.

According to at least one example embodiment, the illustrated apparatus 1700 may represent or realize/embody a (part of a) initiator entity, or an element, function or entity of similar/comparable functionality or operability, in/of a network, e.g., a (core) network of a mobile communication system. Such initiator entity may for example be or relate to a (NF service) consumer or an intermediary entity between a (NF service) consumer and a (NF service) producer. Hence, the apparatus 1700 may be configured to perform a procedure and/or exhibit a functionality and/or implement a mechanism, as described (for an initiator entity or an intermediary entity or a consumer) in any one of FIGS. 2 and 5 to 16.

Accordingly, the apparatus 1700 may be caused or the apparatus 1700 or its at least one processor 1710 (possibly together with computer program code stored in its at least one memory 1720) may be configured to send an authorization request for authorization to request a service operation on a specific resource managed by a responder entity of the network, said authorization request comprising at least one resource filter specifying resource instances of the specific resource that authorization is requested for, and to receive an authorization response to the authorization request for authorization to request the service operation on the specific resource from a repository entity of the network, said authorization response comprising an authorization token comprising at least one resource filter specifying resource instances of the specific resource that authorization is granted for.

According to at least one example embodiment, the illustrated apparatus 1700 may represent or realize/embody a (part of a) responder entity, or an element, function or entity of similar/comparable functionality or operability, in/of a network, e.g., a (core) network of a mobile communication system. Such responder entity may for example be or relate to a (NF service) producer. Hence, the apparatus 1700 may be configured to perform a procedure and/or exhibit a functionality and/or implement a mechanism, as described (for a responder entity or a producer) in any one of FIGS. 3 and 5 to 16.

Accordingly, the apparatus 1700 may be caused or the apparatus 1700 or its at least one processor 1710 (possibly together with computer program code stored in its at least one memory 1720) may be configured to receive a service request for a service operation on a specific resource managed by the responder entity from an initiator entity of the network, said service request comprising at least one resource filter specifying a set of resource instances of the specific resource that the service operation is to be performed on, to perform the service operation on the set of resource instances based on the service request, and to send a service response to the service request for the service operation, said service response comprising a result of performing the service operation on the set of resource instances specified by the at least one resource filter.

According to at least one example embodiment, the illustrated apparatus 1700 may represent or realize/embody a (part of a) repository entity, or an element, function or entity of similar/comparable functionality or operability, in/of a network, e.g., a (core) network of a mobile communication system. Such repository entity may for example be or relate to a network function repository function (NRF). Hence, the apparatus 1700 may be configured to perform a procedure and/or exhibit a functionality and/or implement a mechanism, as described (for a repository entity or an NRF) in any one of FIGS. 4 and 5 to 16.

Accordingly, the apparatus 1700 may be caused or the apparatus 1700 or its at least one processor 1710 (possibly together with computer program code stored in its at least one memory 1720) may be configured to receive an authorization request for authorization for an initiator entity of the network to request a service operation on a specific resource, to determine, based on authorization data, that the initiator entity is authorized to request the service operation on the specific resource, said authorization data comprising mappings between initiator entities and resource instances of resources, comprising a mapping between the initiator entity and resource instances of the specific resource, and to send an authorization response to the authorization request for authorization for the initiator entity to request the service operation on the specific resource.

As mentioned above, an apparatus according to at least one example embodiment may be structured by comprising respective one or more units or means or circuitries for performing corresponding operations, procedures and/or functions. For example, such one or more units or means or circuitries may be implemented/realized on the basis of an apparatus structure, as illustrated in FIG. 17, e.g., by one or more processors 1710, one or more memories 1720, one or more interfaces 1730, or any combination thereof.

FIG. 18 shows a schematic diagram illustrating an example of a structure of apparatuses according to at least one example embodiment.

As shown in FIG. 18, an apparatus 1810 according to at least one example embodiment may represent or realize/embody a (part of a) initiator entity, or an element, function or entity of similar/comparable functionality or operability, in/of a network, e.g., a (core) network of a mobile communication system. Such initiator entity may for example be or relate to a (NF service) consumer or an intermediary entity between a (NF service) consumer and a (NF service) producer. Hence, the apparatus 1810 may be configured to perform a procedure and/or exhibit a functionality and/or implement a mechanism, as described (for an initiator entity or an intermediary entity or a consumer) in any one of FIGS. 1 and 5 to 16.

The apparatus 1810 may comprise (at least) one or more unit/means/circuitry, denoted by sending section 1811, which represent any implementation for (or configured to) sending (send) a service request for a service operation on a specific resource managed by a responder entity of the network, said service request comprising at least one resource filter specifying a set of resource instances of the specific resource that the service operation is to be performed on, and (at least) one or more unit/means/circuitry, denoted by receiving section 1811, which represent any implementation for (or configured to) receiving (receive) a service response to the service request from the responder entity, said service response comprising a result of performing the service operation on the set of resource instances specified by the at least one resource filter.

The apparatus 1810, or its sending and/or receiving sections 1811, 1812, may comprise (at least) one or more unit/means/circuitry which represent any implementation for (or configured to) sending (send) service operation on the specific resource to a repository entity of the network, and (at least) one or more unit/means/circuitry which represent any implementation for (or configured to) receiving (receive) an authorization response to the authorization request for authorization for the initiator entity to request a service operation on the specific resource from the repository entity.

As shown in FIG. 18, an apparatus 1820 according to at least one example embodiment may represent or realize/embody a (part of a) initiator entity, or an element, function or entity of similar/comparable functionality or operability, in/of a network, e.g. a (core) network of a mobile/wireless communication system. Such initiator entity may for example be or relate to a (NF service) consumer or an intermediary entity between a (NF service) consumer and a (NF service) producer. Hence, the apparatus 1820 may be configured to perform a procedure and/or exhibit a functionality and/or implement a mechanism, as described (for an initiator entity or an intermediary entity or a consumer) in any one of FIGS. 2 and 5 to 16.

The apparatus 1820 may comprise (at least) one or more unit/means/circuitry, denoted by sending section 1821, which represent any implementation for (or configured to) sending (send) an authorization request for authorization to request a service operation on a specific resource managed by a responder entity of the network, said authorization request comprising at least one resource filter specifying resource instances of the specific resource that authorization is requested for, and (at least) one or more unit/means/circuitry, denoted by receiving section 1822, which represent any implementation for (or configured to) receiving (receive) an authorization response to the authorization request for authorization to request the service operation on the specific resource from a repository entity of the network, said authorization response comprising an authorization token comprising at least one resource filter specifying resource instances of the specific resource that authorization is granted for.

The apparatus 1820, or its sending section 1821, may comprise (at least) one or more unit/means/circuitry which represent any implementation for (or configured to) sending (send) a service request for the service operation on the specific resource, said service request comprising at least one resource filter specifying the set of resource instances of the specific resource that the service operation is to be performed on.

As shown in FIG. 18, an apparatus 1830 according to at least one example embodiment may represent or realize/embody a (part of a) responder entity, or an element, function or entity of similar/comparable functionality or operability, in/of a network, e.g. a (core) network of a mobile/wireless communication system. Such responder entity may for example be or relate to a (NF service) producer. Hence, the apparatus 1830 may be configured to perform a procedure and/or exhibit a functionality and/or implement a mechanism, as described (for a responder entity or a producer) in any one of FIGS. 3 and 5 to 16.

The apparatus 1830 may comprise (at least) one or more unit/means/circuitry, denoted by receiving section 1831, which represent any implementation for (or configured to) receiving (receive) a service request for a service operation on a specific resource managed by the responder entity from an initiator entity of the network, said service request comprising at least one resource filter specifying a set of resource instances of the specific resource that the service operation is to be performed on, (at least) one or more unit/means/circuitry, denoted by performing section 1832, which represent any implementation for (or configured to) performing (perform) the service operation on the set of resource instances based on the service request, and (at least) one or more unit/means/circuitry, denoted by receiving section 1833, which represent any implementation for (or configured to) sending (send) a service response to the service request for the service operation, said service response comprising a result of performing the service operation on the set of resource instances specified by the at least one resource filter.

Further, the apparatus 1830, or its performing section 1832, may comprise (at least) one or more unit/means/circuitry which represent any implementation for (or configured to) processing (process) the service operation on the set of resource instances. Further, the apparatus 1830, or its performing section 1832, may comprise (at least) one or more unit/means/circuitry which represent any implementation for (or configured to) processing (process) the service operation on the set of resource instances based on determining that the set of resource instances matches the set of resource instances specified by the at least one resource filter, or rejecting the service operation on the set of resource instances based on determining that the set of resource instances does not match the set of resource instances specified by the at least one resource filter.

As shown in FIG. 18, an apparatus 1840 according to at least one example embodiment may represent or realize/embody a (part of a) repository entity, or an element, function or entity of similar/comparable functionality or operability, in/of a network, e.g. a (core) network of a mobile/wireless communication system. Such repository entity may for example be or relate to a network function repository function (NRF). Hence, the apparatus 1840 may be configured to perform a procedure and/or exhibit a functionality and/or implement a mechanism, as described (for a repository entity or an NRF) in any one of FIGS. 4 and 5 to 16.

The apparatus 1840 may comprise (at least) one or more unit/means/circuitry, denoted by receiving section 1841, which represent any implementation for (or configured to) receiving (receive) an authorization request for authorization for an initiator entity of the network to request a service operation on a specific resource, (at least) one or more unit/means/circuitry, denoted by determining section 1842, which represent any implementation for (or configured to) determining (determine), based on authorization data, that the initiator entity is authorized to request the service operation on the specific resource, said authorization data comprising mappings between initiator entities and resource instances of resources, comprising a mapping between the initiator entity and resource instances of the specific resource, and (at least) one or more unit/means/circuitry, denoted by sending section 1841, which represent any implementation for (or configured to) sending (send) an authorization response to the authorization request for authorization for the initiator entity to request the service operation on the specific resource.

Further, the apparatus 1840, or its determining section 1842, may comprise (at least) one or more unit/means/circuitry which represent any implementation for (or configured to) refining (refine) the service operation and/or the resource instances of the specific resource for the service operation. In this regard, the authorization token may designate authorization of the initiator entity to request the service operation on the resource instances specified by the at least one resource filter in the authorization token with respect to the refined service operation and/or the refined resource instances of the specific resource for the service operation.

For further details regarding the operability/functionality of the apparatuses (or units/means thereof) according to example embodiments, reference is made to the above description in connection with any one of FIGS. 1 to 16, respectively.

According to example embodiments, any one of the (at least one) processor, the (at least one) memory and the (at least one) interface, as well as any one of the illustrated units/means, may be implemented as individual modules, chips, chipsets, circuitries or the like, or one or more of them can be implemented as a common module, chip, chipset, circuitry or the like, respectively.

As used herein, the term "circuitry" may refer to one or more or all of the following: (a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions), and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term herein, including in any claims. As a further example, as used herein, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

According to example embodiments, a mobile communication system may comprise any conceivable combination of any depicted or described apparatuses and other network elements or functional entities, which are configured to cooperate as described above.

In general, it is to be noted that respective functional blocks or elements according to above-described example embodiments can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, a (tele)communication network includes a mobile communication system where some examples of example embodiments are applicable. The mobile communication system may include one or more access networks and a core network(s). The mobile communication system may include one or more control elements or functions, such as e.g. access network elements, radio access network elements, access service network gateways or base transceiver stations, like a base station, an access point, a NodeB (NB), an eNB or a gNB, a distributed or a centralized unit, which controls a respective coverage area or cell(s) and with which one or more communication stations such as communication elements or functions, like user devices or terminal devices, like a UE, or another device having a similar function, such as a modem chipset, a chip, a module etc., which can also be part of a station, an element, a function or an application capable of conducting a communication, such as a UE, an element or function usable in a machine-to-machine communication architecture, or attached as a separate element to such an element, function or application capable of conducting a communication, or the like, are capable to communicate via one or more channels via one or more communication beams for transmitting several types of data in a plurality of access domains. Furthermore, core network elements or network functions, such as gateway network elements/functions, mobility management entities, a mobile switching center, servers, databases and the like may be included.

The general functions and interconnections of the described elements and functions, which also depend on the actual network type, are known to those skilled in the art and described in corresponding specifications, so that a detailed description thereof is omitted herein. It should be appreciated that several additional network elements and signaling links may be employed for a communication to or from an element, function or application, like a communication endpoint, a communication network control element, such as a server, a gateway, a radio network controller, and other elements of the same or other communication networks besides those described in detail herein below.

A communication network in examples of example embodiments may also be able to communicate with other networks, such as a public switched telephone network, or a data network, such as the Internet. The communication network (e.g., the radio access network or the core network thereof) may also be able to support the usage of cloud computing for providing network elements or functions thereof, wherein it is to be noted that the network elements or functions thereof of can also be provided by any other hardware platform, such as a distributed computing system. It should be appreciated that an access network (e.g., a radio access network), a core network, and/or respective functionalities may be implemented in any node, host, server, or entity etc. being suitable for such a usage. Generally, a network function can be implemented either as a network element on a dedicated hardware, as a software running on a dedicated hardware, or as a virtualized function instantiated on an appropriate hardware platform, e.g., a cloud computing system.

Any method step is suitable to be implemented as software or by hardware without changing the idea. Such software may be software code independent and can be specified using any known or future developed programming language, such as e.g., Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. A device/apparatus may be represented by a semiconductor chip, a chipset, or a (hardware) module comprising such chip or chipset; this, however, does not exclude the possibility that a functionality of a device/apparatus or module, instead of being hardware implemented, be implemented as software in a (software) module such as a computer program or a computer program product comprising executable software code portions for execution/being run on a processor. A device may be regarded as a device/apparatus or as an assembly of more than one device/apparatus, whether functionally in cooperation with each other or functionally independently of each other but in a same device housing, for example.

Apparatuses and/or units/means or parts thereof can be implemented as individual devices, but this does not exclude that they may be implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present disclosure also covers any conceivable combination of method steps and operations described above, and any conceivable combination of nodes, apparatuses, modules or elements described above, as long as the above-described concepts of methodology and structural arrangement are applicable.

In view of the above, there are provided measures for (enabling/realizing) network operability on a resource instance level in (a core network of) a mobile/wireless communication system. Such measures may exemplarily comprise that an initiator entity sends a service request for a service operation on a specific resource managed by a responder entity of the network, said service request comprising at least one resource filter specifying a set of resource instances of the specific resource that the service operation is to be performed on, and receives a service response to the service request from the responder entity, said service response comprising a result of performing the service operation on the set of resource instances specified by the at least one resource filter.

Even though the present disclosure is described above with reference to the examples according to the accompanying drawings, it is to be understood that the present disclosure is not restricted thereto. Rather, it is apparent to those skilled in the art that the present disclosure can be modified in many ways without departing from the scope of the inventive idea as disclosed herein.

List of Acronyms and Abbreviations

3GPP 3rd Generation Partnership Project
5G 5th Generation
AF Application Function
API Application Programming Interface
HSS Home Subscriber Server
HTTP Hypertext Transfer Protocol
ID Identifier
IMSI International Mobile Subscriber Identity
JSON Java Script Object Notation
MVNO Mobile Virtual Network Operator
NEF Network Exposure Function
NF Network Function
NFV Network Functions Virtualisation
NFVI Network Functions Virtualisation Infrastructure
NR New Radio
NRF NF Repository Function
SBA Service-Based Architecture
SBI Service-Based Interface
SCEF Service Capability Exposure Function
SCP Service Communication Proxy
SDN Software-Defined Networking
S-NSSAI Single—Network Slice Selection Assistance Information
UCMF UE Radio Capability Management Function
UDM Unified Data Manager
UDSF Unstructured Data Storage Function
UDR Unified Data Repository
UE User Equipment
UEID User Equipment Identity
URI Universal Resource Identifier

We claim:

1. An apparatus for a network, the apparatus comprising:
at least one processor;
at least one memory storing instructions of an initiator entity of the network which, when executed by the at least one processor, cause the apparatus to perform at least:
sending, to a repository entity of the network, an authorization request for authorization to request a service operation on a specific resource managed by a responder entity of the network, said authorization request comprising a resource filter specifying resource instances of the specific resource that authorization is requested for, and
receiving, from the repository entity, an authorization response to the authorization request for authorization to request the service operation on the specific resource, said authorization response comprising an authorization token comprising a resource filter specifying resource instances of the specific resource that authorization is granted for;
sending, to a responder entity of the network, a service request for a service of the responder entity to perform a service operation on the specific resource, the service request comprising:
a resource filter specifying a set of resource instances of the specific resource that the service operation is to be performed on; and
the authorization token,
wherein the set of resource instances of the specific resource that the service operation is to be performed on include one or more of the resources instances of the specific resource that authorization is granted for; and
receiving, from the responder entity of the network, a service response to the service request, the service response comprising a result of performing the service operation on the set of resource instances of the specific resource.

2. The apparatus according to claim 1, wherein the resource instances specified by the resource filter comprised in the authorization token correspond to at least part of the resource instances specified by the resource filter comprised in the authorization.

3. The apparatus according to claim 1, wherein the service operation comprises a resource operation for causing filtering or selection of the set of resource instances specified by the resource filter in the service request at the responder entity.

4. The apparatus according to claim 3, wherein the resource operation comprises any one of:
a search operation for causing a search for the set of resource instances specified by the resource filter in the service request;
a read operation for causing reading of the set of resource instances specified by the resource filter in the service request;
a delete operation for causing deletion of the set of resource instances specified by the resource filter in the service request;

a modify/update operation for causing modification or update of the set of resource instances specified by the resource filter in the service request; or a create operation for causing creation of the set of resource instances specified by the resource filter in the service request.

5. The apparatus according to claim 1, wherein the authorization request comprises a token request or discovery request.

6. The apparatus according to claim 1, wherein the resource filter specifying the set of resource instances of the specific resource that the service operation is to be performed on comprises content of resource instances of the set of resource instances.

7. The apparatus according to claim 6, wherein:

the content of resource instances of the set of resource instances defines at least one of a group, a range or a pattern of the set of resource instances of the specific resource that the service operation is to be performed on; or the content of resource instances comprises at least one attribute within the specified resource.

8. The apparatus according to claim 1, wherein the resource filter specifying the set of resource instances of the specific resource that the service operation is to be performed on comprises metadata associated with resource instances of the set of resource instances of the specific resource that the service operation is to be performed on.

9. The apparatus according to claim 8, wherein:

the metadata defines a property of the resource instances of the set of resource instances of the specific resource that the service operation is to be performed on; or the metadata comprises an identifier of an owner or tenant of the resource instances of the set of resource instances of the specific resource that the service operation is to be performed on.

10. The apparatus according to claim 1, wherein the resource filter specifying the set of resource instances of the specific resource that the service requested is to be performed on comprises content of a resource identifier referring to resource instances of the specific resource, and wherein the content of the resource identifier comprises a universal resource identifier variable, wherein the universal resource identifier variable comprises a path or a query parameter of a universal resource identifier of the specified resource.

11. The apparatus according to claim 1, wherein:

the initiator entity comprises a network function service consumer configured to consume or use at least the service of the responder entity;

the responder entity comprises a network function service producer configured to expose at least the service; and the repository entity comprises a network function repository function configured to store information relating to the initiator.

12. An apparatus for a network, the apparatus comprising:

at least one processor; and at least one memory storing instructions of a responder entity of the network which, when executed by the at least one processor, cause the apparatus to perform at least:

receiving, from an initiator entity of the network, a service request for a service of the responder entity to perform a service operation on a specific resource managed by the responder entity, said service request comprising: a resource filter specifying a set of resource instances of the specific resource that the service operation is to be performed on; and an authorization token, the authorization token comprising a resource filter specifying resource instances of the specific resource that authorization was granted for, wherein the set of resource instances of the specific resource that the service operation is to be performed on include one or more of the resources instances of the specific resource that authorization was granted for;

performing the service operation on the set of resource instances of the specific resource; and sending a service response to the service request for the service operation, said service response comprising a result of the performing the service operation on the set of resource instances of the specific resource.

13. The apparatus according to claim 12, wherein the service operation comprises a resource operation for causing the responder entity to perform filtering or selection of the set of resource instances of the specific resource.

14. The apparatus according to claim 13, wherein the resource operation comprises any one of:

a search operation for causing search for the set of resource instances of the specific resource specified by the resource filter;

a read operation for causing reading of the set of resource instances of the specific resource specified by the resource filter;

a delete operation for causing deletion of the set of resource instances specified by the resource filter;

a modify/update operation for causing modification or update of the set of resource instances specified by the resource filter; or a create operation for causing creation of the set of resource instances specified by the resource filter.

15. The apparatus according to claim 12, wherein the performing comprises:

processing the service operation on the set of resource instances.

16. The apparatus according to claim 15, the performing comprising:

processing the service operation on the set of resource instances based on determining that a set of resource instances of the specific resource managed by the responder entity matches the set of resource instances of the specific resource specified by the resource filter, or rejecting the service operation on the set of resource instances based on determining that the set of resource instances of the specific resource managed by the responder entity does not match the set of resource instances of the specific resource that the service operation is to be performed on specified by the resource filter.

17. The apparatus according claim 12, wherein the resource filter specifying the set of resource instances of the specific resource that the service operation is to be performed on comprises content of resource instances of the set of resource instances of the specific resource that the service operation is to be performed on.

18. The apparatus according to claim 17, wherein:

the content of resource instances of the set of resource instances defines at least one a group, a range or a pattern of the set of resource instances of the specific resource that the service operation is to be performed on; or the content of resource instances of the specific resource that the service operation is to be performed on comprises at least one attribute within the specified resource.

19. The apparatus according to claim 12, wherein the resource filter specifying the set of resource instances of the specific resource that the service operation is to be performed on comprises metadata associated with resource instances of the set of resource instances of the specific resource that the service operation is to be performed on.

20. The apparatus according to claim 19, wherein:

the metadata defines a property of the resource instances of the set of resource instances of the specific resource that the service operation is to be performed on; or the metadata comprises an identifier of an owner or tenant of the resource instances of the set of resource instances of the specific resource that the service operation is to be performed on.

21. The apparatus according to 19, wherein the responder entity holds a link for an association between each respective resource instance of resource instances of the specific resource managed by the responder entity and a metadata record comprising metadata associated with the respective resource instance of the specific resource.

22. The apparatus according to claim 21, wherein:

the responder entity stores the one or more resources instances of the specific resource and is connected to at least one entity storing the one or more metadata records for each respective resource instance of the resource instances; or the responder entity stores the specific resource and the one or more metadata records for each one of the resource instances of one or more resources.

23. The apparatus according to claim 19, wherein:

the service request for the service of the responder entity to perform the service operation comprises an indication indicating that provision of complete or partial metadata associated with the resource instances of the set of resource instances is requested; and the service response to the service request for the service operation comprises the complete or partial metadata associated with the resource instances of the set of resource instances.

24. The apparatus according to claim 12, wherein the resource filter specifying the set of resource instances of the specific resource that the service operation is to be performed on comprises content of a resource identifier referring to resource instances of the set of resource instances, and wherein the content of the resource identifier comprises a universal resource identifier variable, wherein the universal resource identifier variable comprises a path or a query parameter of a universal resource identifier of the specified resource.

25. The apparatus according to claim 12 wherein:

the initiator entity and the responder entity include service-based interfaces for communicating;

the initiator entity comprises a network function service consumer of the network configured to consume or use the service, wherein the service is exposed by a network function service producer of the network;

the initiator entity comprises an intermediary entity between a network function service consumer and a network function service producer configured to expose the service; or the responder entity comprises a network function service producer configured to expose the service.

26. An apparatus for a network, the apparatus comprising:

at least one processor; and at least one memory storing instructions of a repository entity of the network which, when executed by the at least one processor, cause the apparatus to perform at least:

receiving, from an initiator entity of the network, an authorization request for authorization for the initiator entity of the network to request a service operation on a specific resource managed by an responder entity;

determining, based on authorization data, that the initiator entity is authorized to request the service operation on the specific resource, said authorization data comprising mappings between initiator entities and resource instances of resources, said mappings comprising a mapping between the initiator entity and resource instances of the specific resource managed by the responder entity; and sending, to the initiator entity, an authorization response to the authorization request, the authorization response indicating that the initiator entity is authorized to request the service operation on the specific resource, the authorization response comprising an authorization token for the initiator entity, the authorization token comprising a resource filter specifying the resource instances of the specific resource that authorization is granted for.

27. The apparatus according to claim 26, wherein the authorization data comprise at least one of identifications, names, types or group defining patterns of the initiator entities.

28. The apparatus according to claim 26, wherein:

the authorization request comprises identification information that identifies the initiator entity.

29. The apparatus according to claim 28, wherein the resource filter specifying the resource instances of the specific resource managed by the responder entity that authorization is granted for comprises content of resource instances of the resource instances of the specific resource managed by the responder entity that authorization is granted for or content of a resource identifier referring to the resource instances of the specific resource managed by the responder entity that that authorization is granted for.

30. The apparatus according to claim 29, wherein:

the content of resource instances is based on or comprises at least one attribute within the specified resource.

31. The apparatus according to claim 28, wherein:

the resource filter specifying the resource instances of the specific resource managed by the responder entity that authorization is granted for comprises content of a resource identifier referring to the resource instances of the specific resource managed by the responder entity that that authorization is granted for; and wherein the content of the resource identifier defines at least one of a group, a range or a pattern of the resource instances of the specific resource managed by the responder entity; or;

wherein the content of the resource identifier comprises a universal resource identifier variable, wherein the universal resource identifier variable comprises a path or query parameter of a universal resource identifier of the specified resource managed by the responder entity.

32. The apparatus according to claim 28, wherein:

the initiator entity comprises a network function service consumer configured to consume or use at least the service exposed by a network function service producer of the network or an intermediary entity between a network function service consumer and a network function service producer configured to expose at least the service;

the repository entity comprises a network function repository function configured to store information relating to a network function service consumer configured to consume or use at least the service.

33. The apparatus according to claim 28, wherein the authorization request comprises a token request or discovery request.

34. The apparatus according to claim 28, wherein the determining comprises:

refining the resource instances of the specific resource managed by the responder entity that authorization is granted for, wherein said authorization token indicates authorization of the initiator entity to request the service operation on the resource instances of the specific resource specified by the at resource filter in the authorization token.

35. The apparatus according to claim 26, wherein the resource filter comprises metadata associated with the resource instances of the specific.

36. The apparatus according to claim 35, wherein:

the metadata defines a property of the resource instances of the resource instances of the specific resource; or the metadata comprises an identifier of an owner or tenant of the resource instances of the specific resource.

* * * * *